United States Patent
Takayama

[19]

[11] Patent Number: 6,043,948
[45] Date of Patent: Mar. 28, 2000

[54] INFORMATION RECORDING AND REPRODUCING APPARATUS

[75] Inventor: Yoshihisa Takayama, Kanagawa, Japan

[73] Assignee: Sony Corporation, Tokyo, Japan

[21] Appl. No.: 08/862,171

[22] Filed: May 22, 1997

Related U.S. Application Data

[63] Continuation of application No. PCT/JP96/03294, Nov. 8, 1996.

[30] Foreign Application Priority Data

| Nov. 8, 1995 | [JP] | Japan | P07-314671 |
| Dec. 8, 1995 | [JP] | Japan | P07-345541 |
| Feb. 13, 1996 | [JP] | Japan | P08-048412 |

[51] Int. Cl.[7] .................................................. G11B 15/18
[52] U.S. Cl. ........................................ 360/69; 360/132
[58] Field of Search ................................ 360/69, 132, 71, 360/48, 25, 53, 94

[56] References Cited

U.S. PATENT DOCUMENTS

| 5,587,849 | 12/1996 | Kori et al. | 360/69 |
| 5,631,784 | 5/1997 | Suzuki et al. | 360/69 |
| 5,726,817 | 3/1998 | Oguro et al. | 360/69 |
| 5,867,335 | 2/1999 | Ozue et al. | 360/132 |

FOREIGN PATENT DOCUMENTS 7-307063  11/1995  Japan .

*Primary Examiner*—Thang V. Tran
*Attorney, Agent, or Firm*—Jay H. Maioli

[57] ABSTRACT

An information recording/reproducing apparatus including an identifying portion for identifying a loaded cassette as a first type tape cassette or a second type tape cassette, the loaded cassette having a tape-shaped record medium in a cartridge, the first type tape cassette having a non-volatile memory in the cartridge, the second type tape cassette not having a non-volatile memory in the cartridge, an initializing portion for initializing at least the non-volatile memory when the loaded cassette is the first type tape cassette and for initializing the tape-shaped record medium when the loaded cassette is the second tape cassette, and a recording/reproducing portion for recording/reproducing data to/from the tape-shaped record medium in the tape cassette, the tape-shaped record medium being initialized by the initializing portion.

5 Claims, 25 Drawing Sheets

Fig. 7
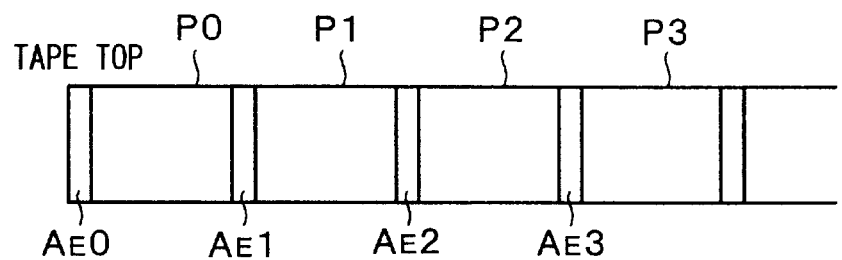
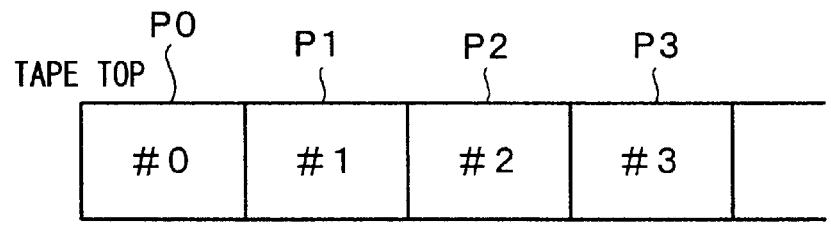
Fig. 8A
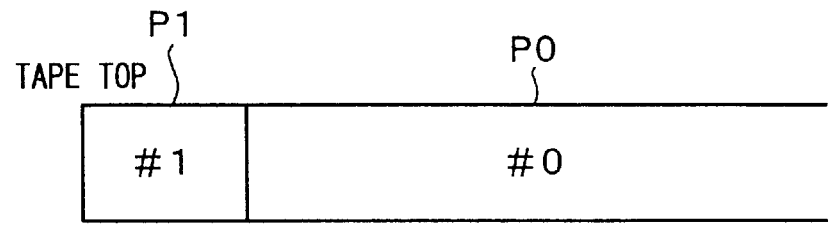
Fig. 8B

```
type link_info=record                      · · · · · · · · · · · · · · · · 8bytes
     cell_checksum    : BYTE ;        {CHECK SUM OF CELL}
     reserved         : BYTE ;
     length           : INTEGER ;     {LENGTH OF CELL}
     prev_ptr         : INTEGER ;     {POINTER TO PREVIOUS CELL}
     next_ptr         : INTEGER ;     {POINTER TO NEXT CELL}
end;
```

NUMBER OF BYTES

Fig. 21

| USER ID DEFINED AREA | | | USER |
|---|---|---|---|
| 1st | 2nd | 3rd | |
| 0 | 0 | 0 | COMMON |
| 0 | 0 | 1 | ASCII TEXT |
| | | | |
| 1 | 5 | 2 | COMPANY A |
| 1 | 5 | 3 | COMPANY B |

INFORMATION RECORDING AND REPRODUCING APPARATUS

This application is a continuation of International Application PCT/JP96/03294 with an international filing date of Nov. 8, 1996.

BACKGROUND OF THE INVENTION

1. Field of the Invention

The present invention relates to an information recording/reproducing apparatus suitable for a tape streamer drive with a cassette tape having a non-volatile memory that stores information with respect to a magnetic tape.

2. Description of the Related Art

Since a tape streamer drive that records and reproduces digital data to/from a magnetic tape has a large storage capacity, it has been widely used so as to back up data stored in a storing device such as a hard disk or the like. In addition, the tape streamer drive is suitable for recording a large file that contains moving picture data.

In such a tape streamer drive, digital data is recorded/reproduced to/from a magnetic tape by a helical scan method with a rotating head using a tape cassette similar to an 8-mm type tape cassette.

In such a tape streamer drive, for example SCSI (Small Computer System Interface) is used as an input/output interface. In the recording mode, data is input from a host computer through the SCSI interface. Input data is supplied as fixed-length block data to the tape streamer drive. The input data is variable-length encoded with for example LZ code so as to compress the data. The compressed data is temporarily stored in a buffer memory. The data stored in the buffer memory is supplied as predetermined groups to a recording/reproducing system. Thereafter, the data is recorded on a magnetic tape with a rotating head. In the reproducing mode, data is reproduced from the tape with the rotating head. The data is temporarily stored in the buffer memory. The data that is output from the buffer memory is expanded to the original data. The resultant data is supplied to the host computer through the SCSI interface.

A system of which a non-volatile memory is disposed in a cassette tape loaded to a tape streamer drive that records/reproduces data with a rotating head has been proposed as Japanese Patent Application No. 8-67520 by the applicant of the present invention. In the non-volatile memory, information such as the date and place of manufacture of the tape cassette, the thickness, length, and material of the tape is recorded.

When data is stored in the memory of the tape cassette, record areas for individual information items such as the date and place of the manufacture of the tape cassette, the thickness, length, and material of the tape, management information of individual partitions, and user information are formed on the memory map so as to record data of the information items in the respective record areas. However, the storage capacity of the non-volatile memory disposed in the tape cassette is limited. In addition, when the record areas are formed for individual information items, the format of data recorded to the tape cassette and the information items cannot be flexibly changed. Thus, the storage capacity of the non-volatile memory may become insufficient or wasteful.

When one tape is divided into a plurality of partitions and data is managed for each partition, it is preferred to record management information and user information for each partition. Thus, in the case of the tape cassette with the non-volatile memory, management information and user information for each partition are stored in the non-volatile memory.

However, when management data for each partition is stored in the non-volatile memory, storage areas for management information corresponding to the number of available partitions should be provided in the non-volatile memory. Since the storage capacity of the non-volatile memory is limited, when large storage areas are assigned to the management information for the partitions, sufficient storage areas for user data and so forth cannot be obtained. In addition, when the number of partitions that have been actually formed is small, storage areas for the management information for the partitions become wasteful.

There is another type of tape cassette. This tape cassette does not have a non-volatile memory. Thus, a tape cassette with a non-volatile memory or a tape cassette without a non-volatile memory may be loaded to a tape streamer driver. Consequently, a system that allows a tape in a tape cassette without a non-volatile memory to be divided into a plurality of partitions is desired.

OBJECTS AND SUMMARY OF THE INVENTION

An object of the present invention is to provide an information recording/reproducing apparatus that can flexibly deal with changes of the format and items of data recorded in a tape cassette.

Another object of the present invention is to provide an information recording/reproducing apparatus that can flexibly deal with a desired number of partitions so as to prevent the storage capacity from being wastefully used.

A first aspect of the present invention is an information recording/reproducing apparatus, comprising an identifying means for identifying a loaded cassette as a first type tape cassette or a second type tape cassette, the loaded cassette having a tape-shaped record medium in a cartridge, the first type tape cassette having a non-volatile memory in the cartridge, the second type tape cassette not having a non-volatile memory in the cartridge, an initializing means for initializing at least the non-volatile memory when the loaded cassette is the first type tape cassette and for initializing the tape-shaped record medium when the loaded cassette is the second tape cassette, and a recording/reproducing means for recording/reproducing data to/from the tape-shaped record medium in the tape cassette, the tape-shaped record medium being initialized by the initializing means.

A second aspect of the present invention is an information recording/reproducing apparatus for recording/reproducing data to/from a tape-shaped record medium disposed in a cartridge of a tape cassette that further includes a non-volatile memory, comprising an initializing means for dividing the tape-shaped record medium into a plurality of record blocks corresponding to initialization data, creating management information in a list structure, and storing the management information to the non-volatile memory, the management information being composed of history information and pointer information, the history information representing a history of data recorded for each record block, the pointer information representing a record position of the history information of the next and previous record blocks, and a recording/reproducing means for recoding/reproducing data to/from the tape-shaped record medium corresponding to the management information stored in the non-volatile memory.

According to the present invention, when a cassette tape that has not been used is loaded, the non-volatile memory and the magnetic tape are initialized depending on whether or not the tape cassette has the non-volatile memory. Thus, the compatibility of the tape cassette with the non-volatile memory and the tape cassette without the non-volatile memory can be secured.

According to the present invention, partition information and user information are stored in the non-volatile memory disposed in the tape cassette. The partition information and user information are basically structured as cells. The cells are disposed in a list structure of which link information is represented by pointers. With the list structure, the number of partitions and the data format can be flexibly changed. Thus, the user information can be effectively disposed.

These and other objects, features and advantages of the present invention will become more apparent in light of the following detailed description of a best mode embodiment thereof, as illustrated in the accompanying drawings.

BRIEF DESCRIPTION OF THE DRAWINGS

FIGS. 7, 8A, and 8B are schematic diagrams for explaining partitions of the tape streamer drive according to the present invention;

FIGS. 20A, 20B, and 21 are schematic diagrams for explaining a user ID;

DETAILED DESCRIPTION OF THE PREFERRED EMBODIMENT

Figure 1:
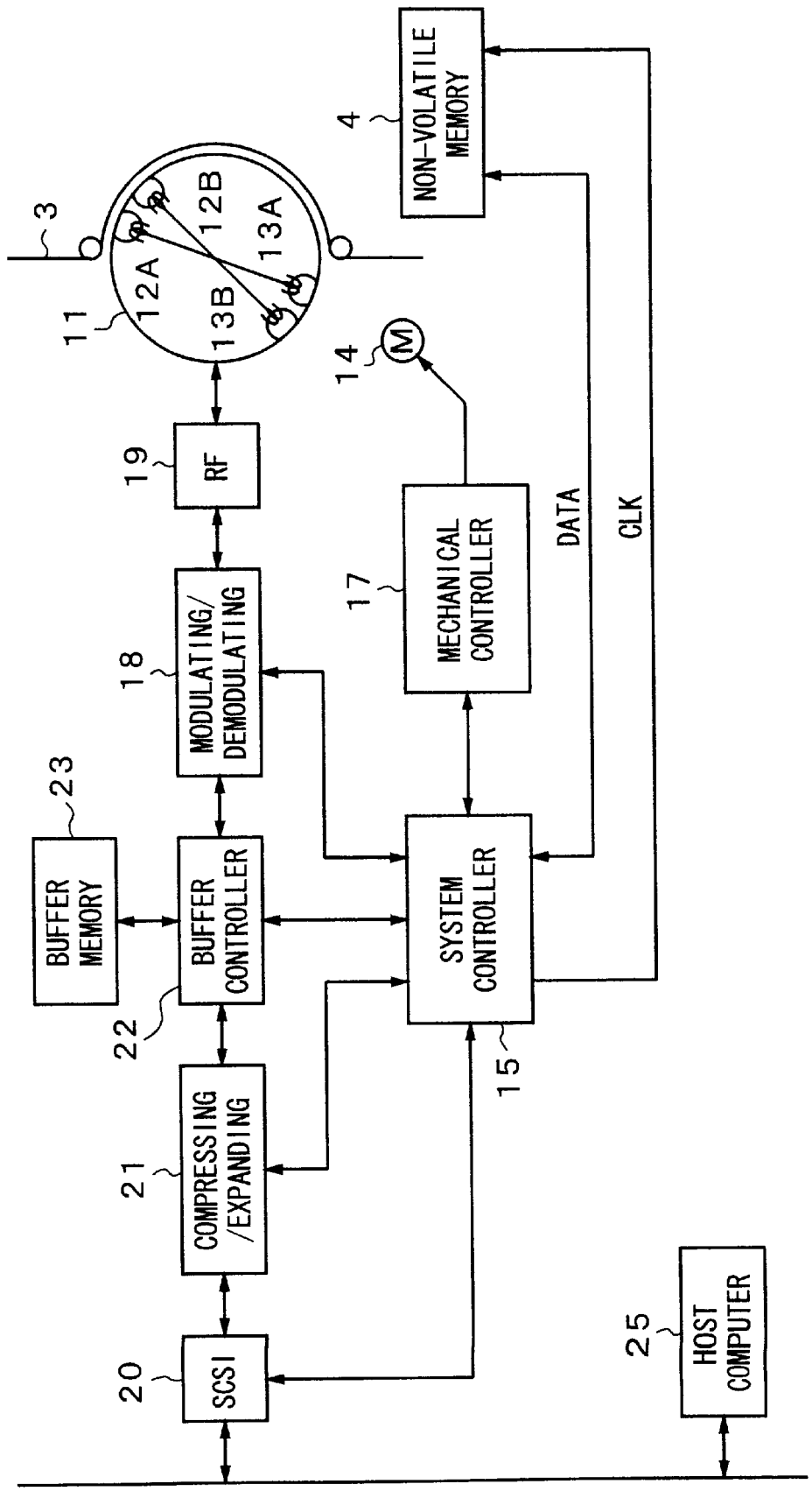
FIG. 1 is a block diagram showing the structure of a tape streamer drive according to the present invention.

With reference to the accompanying drawings, an embodiment of the present invention will be described. FIG. 1 is a block diagram showing an example of the structure of a tape streamer drive according to the present invention. In the tape streamer drive, a tape cassette having an 8 mm-wide tape is used. Data is recorded on a magnetic tape by a helical scan method.

Figure 2:
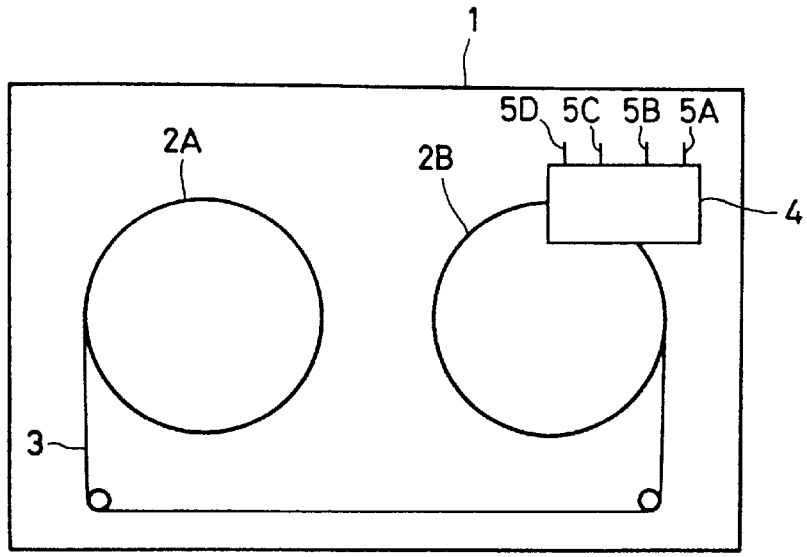
FIG. 2 is a plan view for explaining an example of a tape cassette according to the present invention.

As shown in FIG. 2, the tape cassette 1 has reels 2A and 2B. An 8-mm wide magnetic tape is disposed between the reels 2A and 2B. For example, picture information and/or audio information is recorded/reproduced as digital data to/from the magnetic tape 3. In addition, the tape cassette 1 has a non-volatile memory 4. Hereinafter, this non-volatile memory 4 is referred to as MIC (Memory in Cassette). The module of the MIC 4 has a +5 V power supply terminal 5A, a data input/output terminal 5B, a clock signal input terminal 5C, and a ground terminal 5D. The MIC 4 stores tape information (such as the date and place of the manufacture of the tape cassette, and the thickness, length, and material of the tape), management information of each partition, user information, picture information, and/or audio information.

Figure 3:
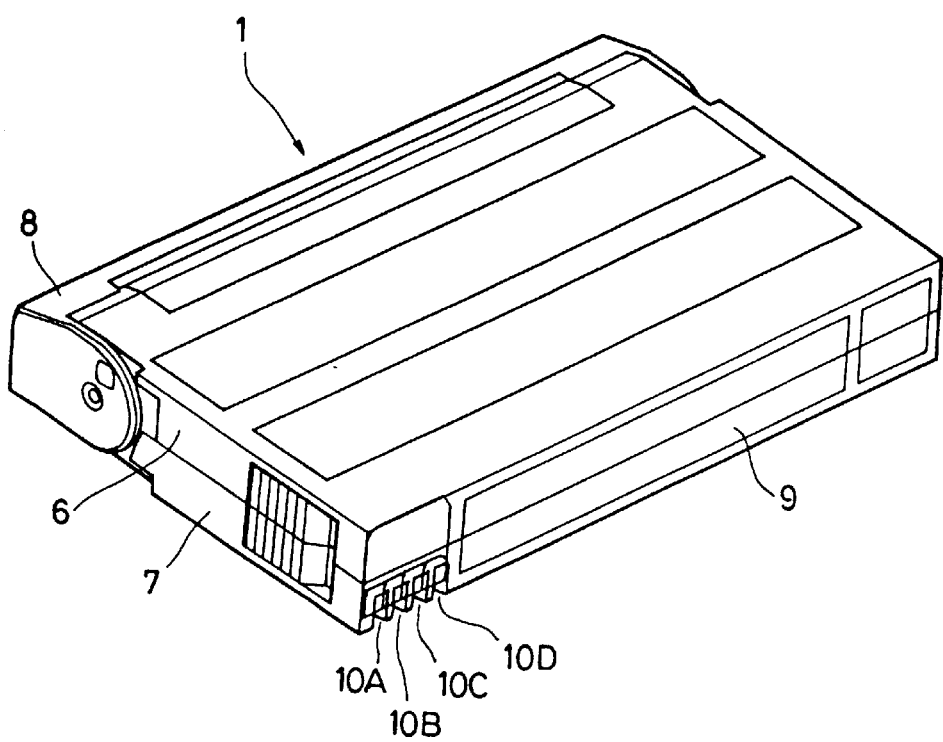
FIG. 3 is a perspective view for explaining an example of a tape cassette according to the present invention.

As shown in FIG. 3, as external structural members, the tape cassette 1 has an upper case 6, a lower case 7, and a guard panel 8. The external structure of the tape cassette 1 is basically the same as the external structure of the tape cassette used for a conventional 8-mm VCR. On a side with a label 9 of the tape cassette 1, terminal pins 10A, 10B, 10C, and 10D are disposed. The terminal pins 10A, 10B, 10C, and 10D are connected to the +5 V power terminal 5A, the data input/output terminal 5B, the clock signal input terminal 5C, and the ground terminal 5D of the MIC 4 in the tape cassette 1, respectively.

There is another type of tape cassette 1 that does not have the MIC 4. To determine whether or not the tape cassette 1 has the MIC 4, a clock signal is supplied to the clock signal input terminal 5C of the tape cassette 1. When the data input/output terminal 5B outputs a signal corresponding to the clock signal, it can be determined that the tape cassette 1 has the MIC 4.

In the above-described example, the tape cassette 1 has the four terminal pins 10A, 10B, 10C, and 10D. However, a new standard with four terminal pins is being considered.

In FIG. 1, reference numeral 11 is a rotating drum. The rotating drum 11 has recording heads 12A and 12B and reproducing heads 13A and 13B. The recording heads 12A and 12B are disposed very closely with different azimuth angles. Likewise, the reproducing heads 13A and 13B are disposed very closely with different azimuth angles.

The magnetic tape 3 is pulled out from the tape cassette 1 and wound around the rotating drum 11. The rotating drum 11 is rotated by a drum motor 14. The magnetic tape 3 is supplied by a capstan motor and a pinch roller (not shown). The drum motor 14 is rotated under the control of a mechanical controller 17. The mechanical controller 17 performs a drum servo process and a tracking servo process. The mechanical controller 17 is bi-directionally connected with a system controller 15 that controls the entire system.

Record data on the magnetic tape 3 is modulated by a modulating/demodulating circuit 18. The resultant data is supplied to the recording heads 12A and 12B through an RF amplifier 19. The recording heads 12A and 12B record data along helical tracks on the magnetic tape 3. Since the recording heads 12A and 12B have different azimuth angles, the helical tracks alternately have different azimuth angles.

Data of the magnetic tape 3 is reproduced with the reproducing heads 13A and 13B. Output data of the reproducing heads 13A and 13B is supplied to the modulating/demodulating circuit 18 through the RF amplifier 19. The RF amplifier 19 demodulates the reproduction data.

In the tape streamer drive, data is input/output through the SCSI interface. In other words, in the recording mode, data is supplied as records (each of which is composed of for example 32 kbytes) from a host computer 25. This data is inputted through the SCSI interface 20. The input data is supplied to a data compressing/expanding circuit 21.

The data compressing/expanding circuit compresses/expands data corresponding LZ coding method. In the LZ coding method, the repetition of an input character sequence is detected and data is compressed corresponding to the repetition. For example, unique codes are assigned to character strings that have been processed and stored in a dictionary form. The input character string is compared with the dictionary. When they match, the input character string is converted into a relevant code in the dictionary. When they do not match, the input character string is successively registered to the dictionary. In such a manner, input character strings are registered to the dictionary and the character strings are converted into relevant codes in the dictionary so as to compress data.

Output data of the data compressing/extending circuit 21 is temporarily stored in a buffer memory 23 under the control of a buffer controller 22. Data is recorded for each group that is composed of a predetermined number of tracks. Data of each group is supplied from the buffer memory 26 to the modulating/demodulating circuit 18. The modulating/demodulating circuit 18 modulates record data. Output data of the modulating/demodulating circuit 18 is supplied to the recording heads 12A and 12B through the RF amplifier 19. The recording heads 12A and 12B record the data on helical tracks of the magnetic tape 3.

In the data reproducing mode, the data is reproduced with the reproducing heads 13A and 13B. Output data of the reproducing heads 13A and 13B is supplied to the modulating/demodulating circuit 18 through the RF amplifier 19. The modulating/demodulating circuit 18 demodulates the reproduction data. Output data of the modulating/demodulating circuit 18 is temporarily stored in the buffer memory 23 under the control of the buffer controller 22.

Output data of the buffer memory 23 is supplied to the data compressing/extending circuit 21. The data compressing/extending circuit 21 extends the data to the original data. Output data of the data compressing/extending circuit 21 is output to the host computer 25 through the SCSI interface 20.

The tape cassette 1 has the MIC 4. The system controller 15 inputs/outputs data to/from the MIC 4. Information is exchanged between the MIC 4 and the host computer 25 corresponding to an SCSI command. Thus, it is not necessary to connect the MIC 4 and the host computer 25. Instead, the tape cassette 1 and the host computer 25 are connected through only the SCSI interface.

Figure 4:
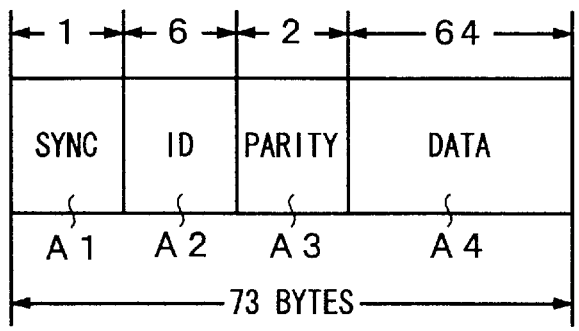
FIGS. 4 and 5 are schematic diagrams for explaining a record format of a tape of the tape streamer drive according to the present invention.
Figure 5:
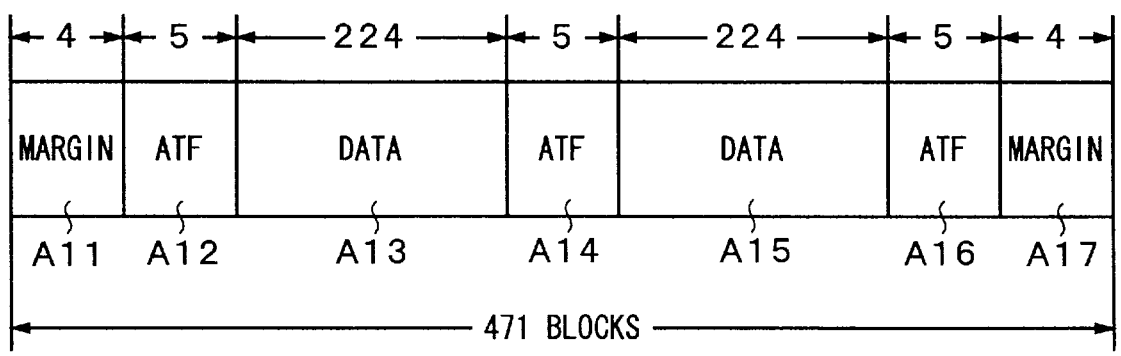

FIGS. 4 and 5 show the structure of data recorded on the magnetic tape 3. As shown in FIG. 4, data is recorded/reproduced as blocks to/from the magnetic tape 3. One block is composed of a SYNC Al of one byte, ID data of six bytes (used for searching data), a parity A3 of two bytes, and data A4 of 64 bytes.

Data is formed on each track as shown in FIG. 5. In other words, data of 471 blocks is formed on one track. As shown in FIG. 5, ATF areas A12 and A16 (used for tracking control) are formed inside margins A11 and A17 (each have four blocks) at both ends of each track. An ATF area A14 is formed in the middle of one track. Each of the ATF areas A12, A14, and A16 has five blocks. A data area A13 of 224 blocks is formed between the ATF areas A12 and A14. A data area A15 of 224 blocks is formed between the ATF areas A14 and A16.

Figure 6:
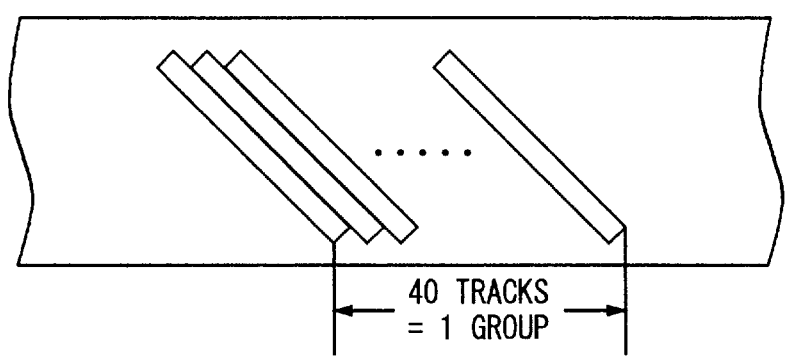
FIG. 6 is a schematic diagram for explaining a group of data used in the tape streamer drive according to the present invention.

As shown in FIG. 6, data is recorded as groups (each of which is composed of 40 tracks (20 frames)) on the magnetic tape 3. Since record data is compressed in a variable length corresponding to the LZ coding method, the number of records of one group is not uncertain. Data of each group contains information of records of the group and error correction code.

As shown in FIG. 7, in the tape streamer drive, one tape can be divided into a plurality of partitions P0, P1, P2, and so forth. The number of partitions can be designated up to 256. When a tape is partitioned, areas for loading/unloading the tape can be designated for individual partitions. These areas are referred to as device areas or optional device areas $A_E0$, $A_E1$, $A_E2$, and so forth.

In the tape streamer drive, SDX mode and DDS mode can be used to partition the tape in different manners.

In the SDX mode, as shown in FIG. 8A, up to 256 partitions P0, P1, P2, and so forth can be designated from the tape top. On the other hand, in the DDS mode, as shown in FIG. 8B, at most two partitions P1 and P0 are designated.

As shown in FIG. 8B, in the DDS mode, the partition number at the tape top is #1. The partition #1 is followed by the partition #0. When the storage capacity of the partition #1 is designated, the rest of the storage capacity of the tape becomes the storage capacity of the partition #2.

On the other hand, in the SDX mode, the partition numbers are designated #0, #1, #2, and so forth from the tape top. A new partition is appended after the existing partition.

To exchange data between the MIC 4 in the tape cassette 1 and the host computer 25, the SCSI interface is provided with commands. As described above, to secure the compatibility of the SDX mode and the DDS mode, new commands are provided. These commands are "Sdx Device Configuration", "Sdx Append Partition", "Sdx Log Select", and "Sense Page List".

The "Sdx Device Configuration" command is used to select the SDX mode or the DDS mode and designate an optional device area. The "Sdx Device Configuration" contains an SDX bit, a device bit, and an ABS bit.

When the SDX bit is "0", the tape streamer drive determines that the tape has been formatted in the DDS mode. In the DDS mode, the maximum number of partitions is 2. The tape streamer drive designates the partition numbers #1 and #0 to partition numbers #0 and #1, respectively. In this mode, the tape streamer drive does not form the optional device area and does not use the MIC.

When the SDX bit is "1", the tape streamer drive determines that the tape has been formatted in the DDX mode has been selected. In this mode, the tape streamer drive designates the maximum number of partitions to 256 in the order of #0, #1, #2, #3, and so forth. In this case, the tape streamer drive can form the optional device area and use the MIC.

When the SDX bit is "0" and the device bit is "1", the tape streamer drive designates the partition numbers #0, #1, #2, #3, and so forth. In this case, each partition should have the optional device area. In this case, the tape streamer drive can use the MIC.

When the ABS bit is "1", the tape structure drive creates and holds an absolute volume map so as to search data at high speed.

The "Sdx Append Partition" command is used to append one partition. The "Sdx Append Partition" command contains an FDP bit, an SDP bit, an IDP bit, and a PSUM bit. A new partition is appended to the last partition. Normally, the bits of the "Sdx Append Partition" command are maintained in the state that FDP=0, SDP=0, IDP=1, and PSUM= 10. The "Sdx Append Partition" command should be issued after the last partition. When the "Sdx Append Partition" command is issued in a partition other than the last partition, the tape streamer drive performs a condition check.

The "Sdx Log Select" command is composed of a code for deleting an absolute volume map, a code for creating a new user volume note, a code for deleting an existing user volume note, a code for deleting a particular user partition note, a code for creating a new user partition note, and a code for writing comment information.

The "Sense Page List" command is composed of a code for reading manufacture information, a code for reading volume information, a code for reading partition information, a code for representing whether or not an absolute volume map is present, a code for reading an absolute volume map, a code for asking the available number of bytes of a new user volume, a code for checking the size of an existing user volume note, a code for reading a user volume note, a code for obtaining a list of partitions that have user partition notes, a code for asking the available number of bytes of a new user partition note, a code for reading a user partition note, and a code for reading comment information.

The application volume map, the user volume note, the user application note, the volume manufacture information, the partition information, the absolute volume map, and so forth are information written to the MIC. These information will be described later.

Figure 9:
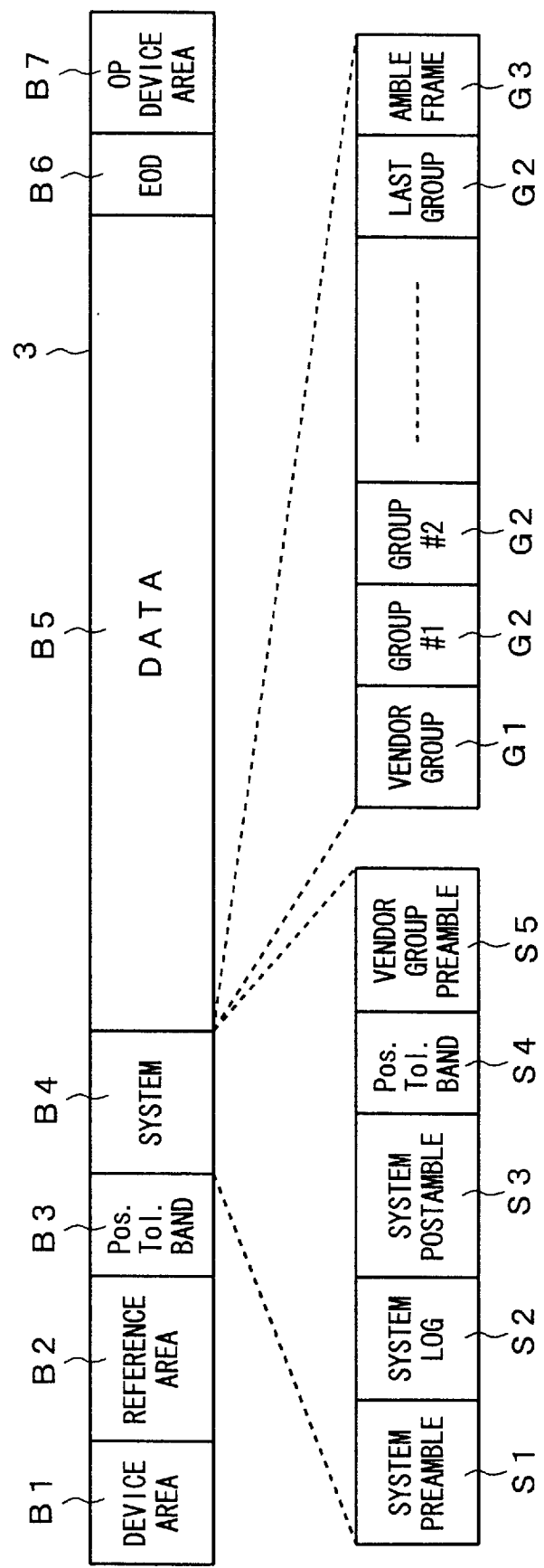
FIGS. 9 and 10 are schematic diagrams for explaining record formats of a tape for use with the tape streamer drive according to the present invention.
Figure 10:
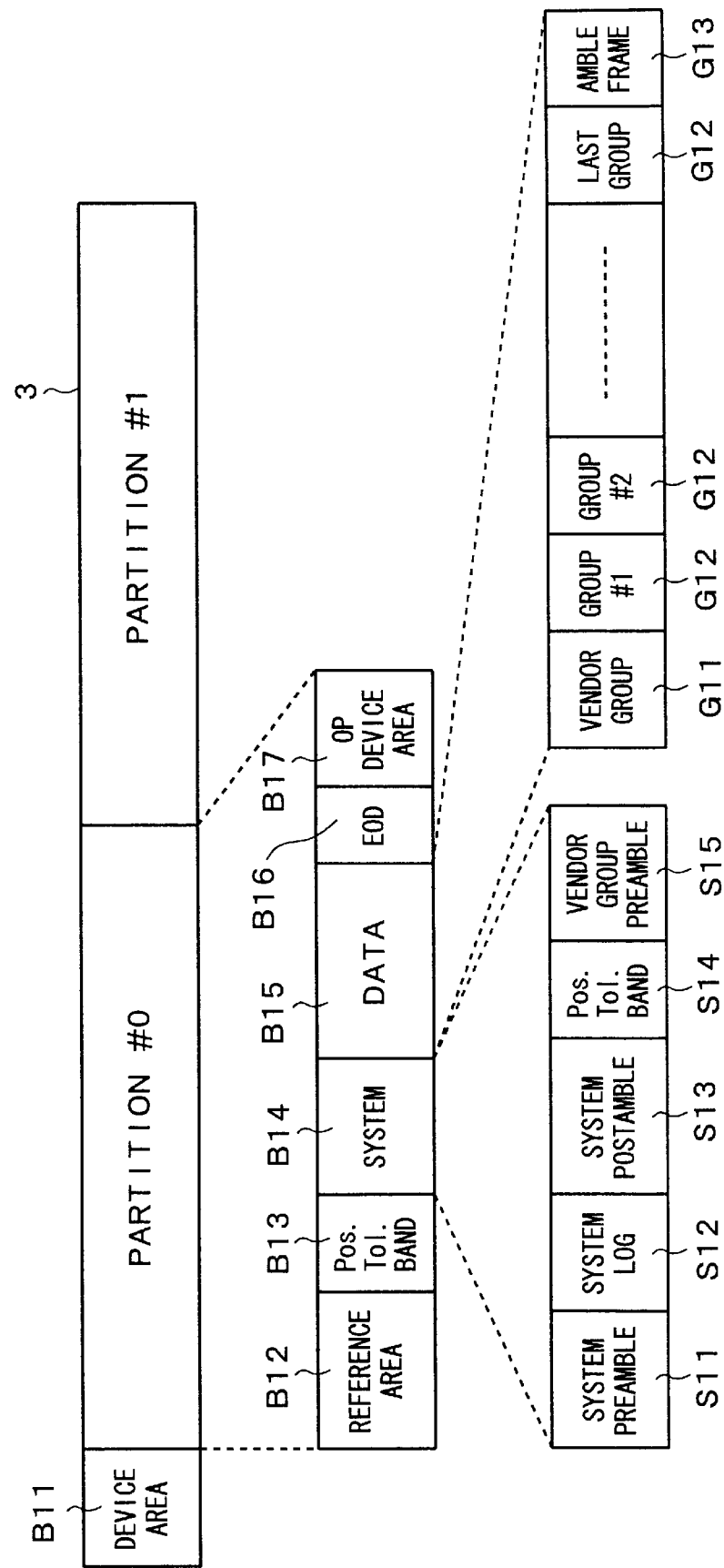

FIG. 9 is a schematic diagram showing the structure of record data on the magnetic tape 3 in the case that one tape is used as one partition in the SDX mode. FIG. 10 is a schematic diagram showing the structure of record data on the magnetic tape 3 in the case that one tape is divided into a plurality of partitions in the SDX mode.

As shown in FIG. 9, when one tape is used with one partition in the SDX mode, a device area B1 for loading/unloading the tape is formed at the top of the tape. The device area B1 is followed by a reference area B2. The reference area B2 is followed by a position tolerance band area B3 for absorbing an error. The tolerance band area B3 is followed by a system area B4.

The system area B4 has a system preamble S1, a system log S2, a system postamble S3, a position tolerance band S4, and a vendor group preamble S5. The system area B4 is followed by data area B5.

The data area B5 stores data for each group. The data area starts with a vendor group G1. The vendor group G1 is followed by data G2, G2, and so forth corresponding to groups #1, #2, and so forth. The data area B5 ends with an amble frame G3.

The data area B5 is followed by an EOD area B6 for representing the last end of data. The EOD area B6 is followed by an optional device area B7 for loading and unloading the tape.

As shown in FIG. 10, when one tape is divided into a plurality of partitions, a device area B11 for loading and unloading the tape is formed. The device area B11 is followed by a reference area B12 for a partition #0. The reference area B12 is followed by a position tolerance band area B13 for absorbing an error. The reference area B12 is followed by a system area B14 of the partition #0.

The system area B14 for the partition #0 is composed of a system preamble S11, a system log S12, a system postamble S13, a position tolerance band S14, and a bender group preamble S15 for the partition #0.

The system area B14 is followed by a data area B15 for the partition #0. As with the above-described one-partition structure, data is recorded as groups in the data area B15. The data area B15 is followed by an EOD data area B16 for representing the last end of data of the partition #0.

When a plurality of partitions are used, as with the partition #0, a system area for the next partition (partition #1) is formed. The system area is followed by a data area of the next partition.

When a tape is used with a plurality of partitions, the system area B14 is formed for each partition. In the system area B14, the system log area S12 is formed. The system log area S12 is used to record a use history of the tape cassette. The system log area S12 is used for a tape cassette that does not have the MIC 4. When a tape cassette has the MIC 4, a history for each partition is stored in the MIC 4.

The contents of the system log area are basically the same as those in a system log area of partition information of the MIC 4 (that will be described later).

In FIG. 1, the data capacity of the MIC 4 is for example 2 kbytes. Of course, the MIC 4 with a data capacity of 2 kbytes or more can be provided. The MIC 4 stores manufacture information (such as the place and date of the manufacture of the tape cassette and the thickness and length of the tape), information of the entire cassette in the initialization state, and initialization information (such as information of each partition). In addition, the MIC 4 can store information necessary for searching data at high speed, user information, and picture and/or audio information. Next, the data structure of the MIC 4 will be described in detail.

Figure 11:
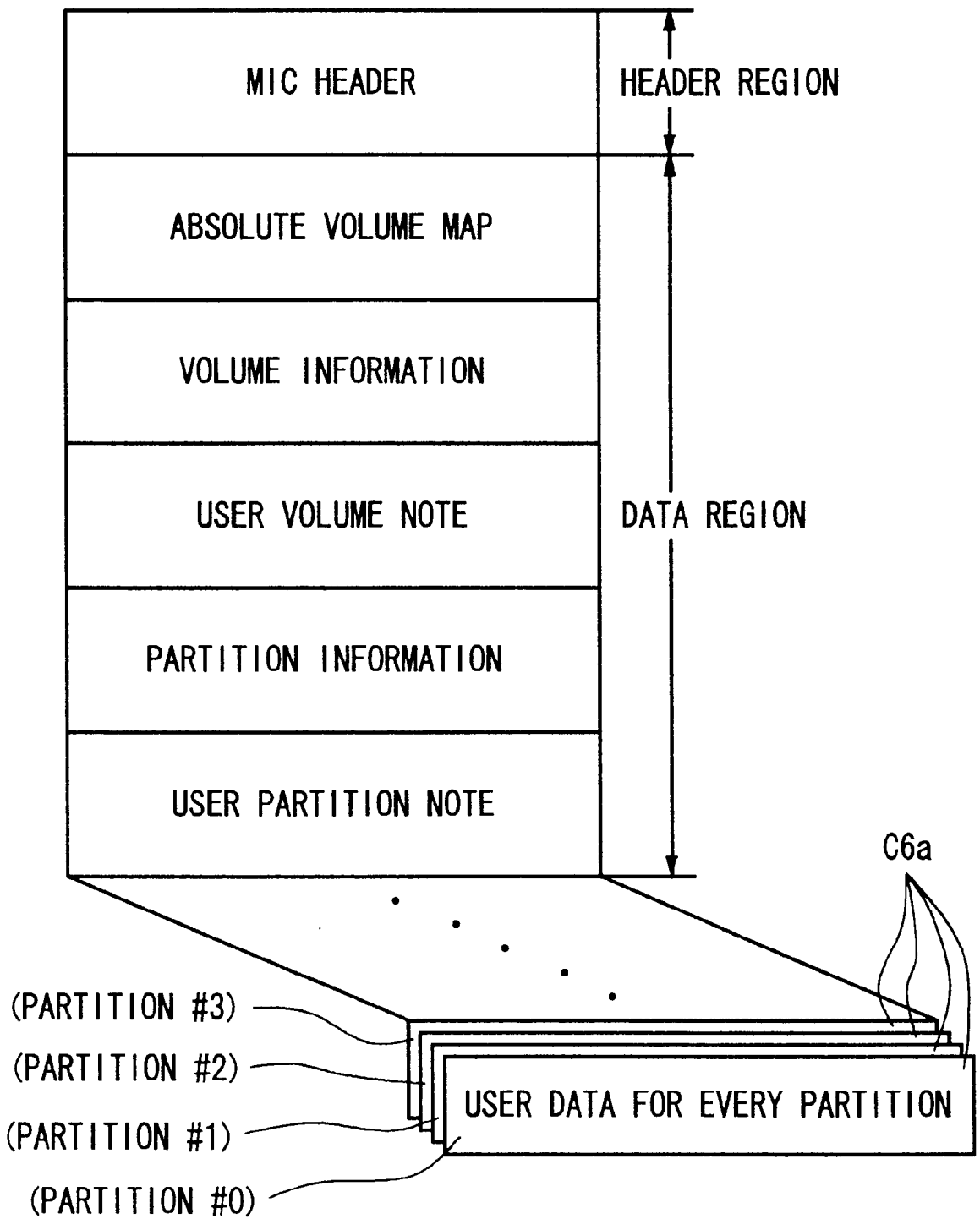
FIGS. 11 and 12 are schematic diagrams for explaining record formats of an MIC disposed in the tape cassette according to the present invention.
Figure 12:
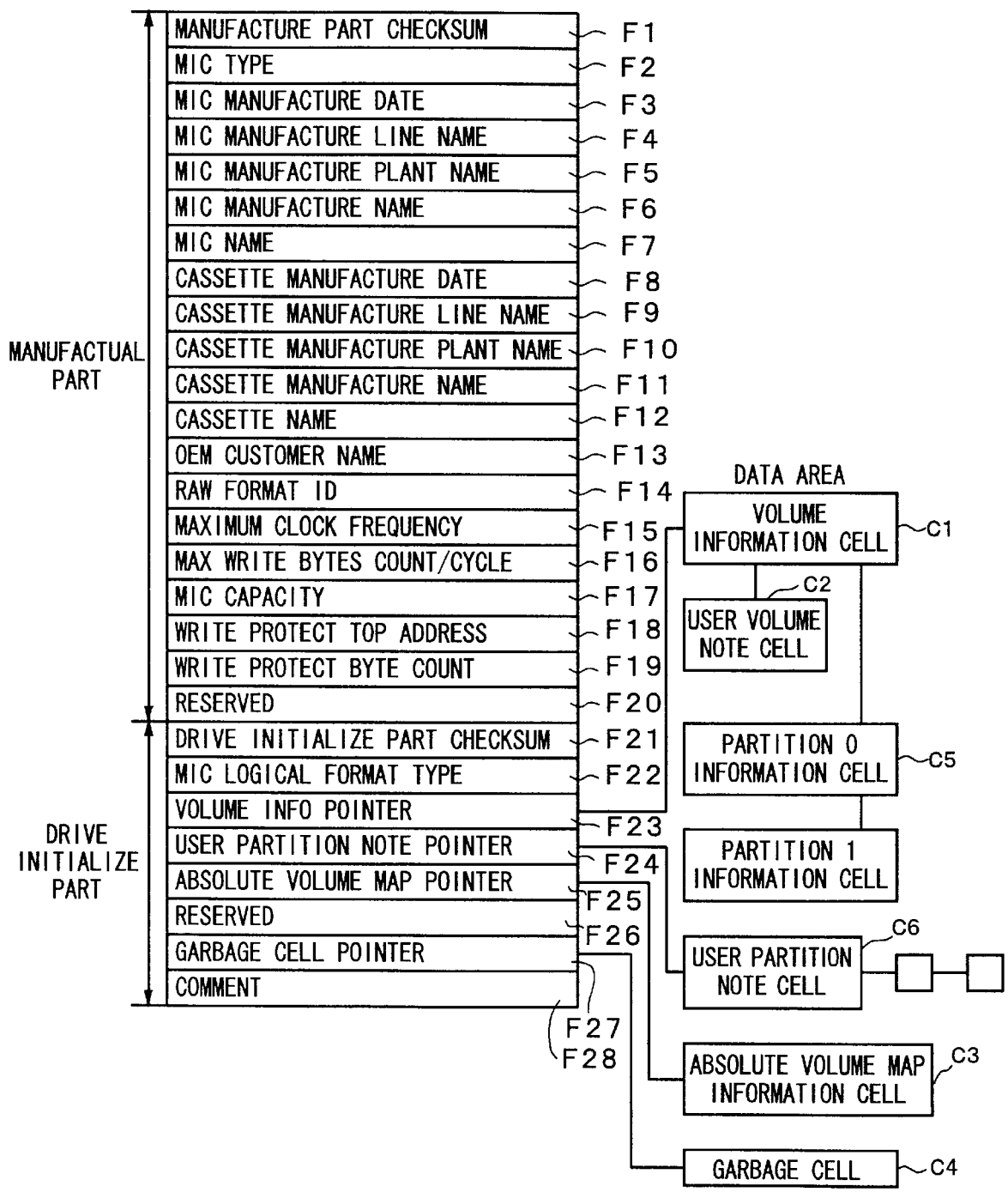

FIGS. 11 and 12 show the data structure of the MIC.

In particular, FIG. 11 shows the structures of partition information and user information stored in the data area of the MIC 4. FIG. 12 shows the details of the header area and the relation between the header area and the data area.

As shown in FIGS. 11 and 12, a header area is formed at the top of the data of the MIC 4. The header area is followed by a data area. The data area stores absolute position information of the magnetic tape (absolute volume map), information of a use history of the magnetic tape (volume information), user (vendor) information of the tape cassette (user volume note), various history information for record data for each partition on the magnetic tape (partition information), and various user information for each partition such as a comment (user partition note) that the user can write. The information stored in the data area of the MIC 4 is formed in a list structure. Next, the list structure will be described.

Figures 13, 14:
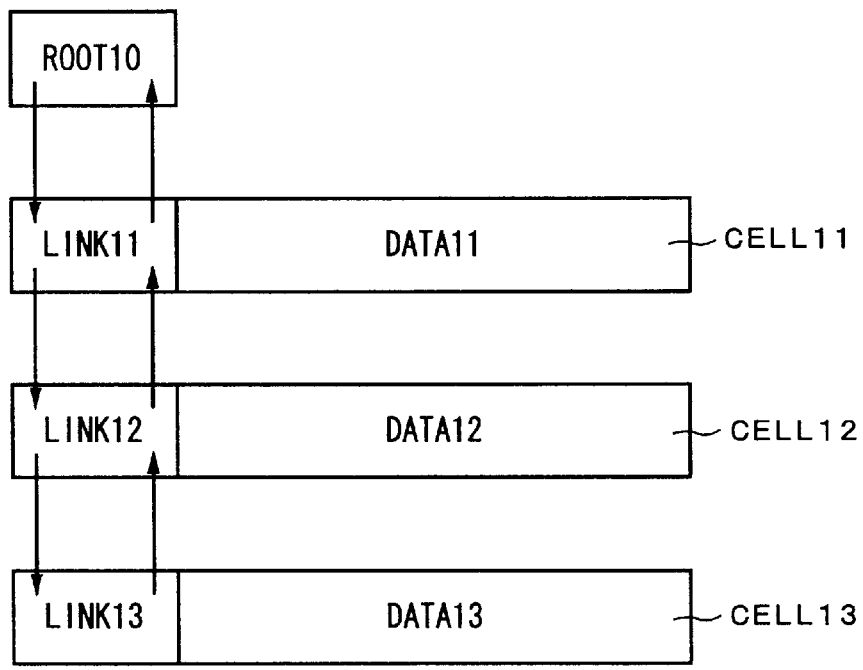
FIG. 13 is a schematic diagram for explaining a list structure.
FIG. 14 is a program list showing the definition of link information.

FIG. 13 is a schematic diagram for explaining the list structure. In FIG. 13, CELL 11, CELL 12, and CELL 13 that are storage blocks are composed of DATA 11, DATA 12, and DATA 13 and LINK 11, LINK 12, and LINK 13, respectively. For example, a ROOT 10 has a pointer as link information that represents the address of the CELL 11. This pointer represents the position of the CELL 11. The CELL 11 has a pointer as link information that represents the address of the CELL 12. The pointer represents the position of the CELL 12. The CELL 12 has a pointer as link information that represents the address of the CELL 13. The pointer represents the position of the CELL 13.

The CELL 13 has a pointer as link information that represents the address of the CELL 12. The pointer represents the position of the CELL 12. The CELL 12 has a pointer as link information that represents the address of the CELL 11. The pointer represents the position of the CELL 11.

In the list structure, a target cell can be accessed through the link information of each cell.

As will be described later, volume information, a user volume note, absolute volume map information, a garbage, partition information, and a user partition note each have link information. The link information is basically defined as shown in FIG. 14.

Referring to FIG. 14, assume that the variable name of the link information is link_info. The link_info is composed of eight bytes that are a check sum of one byte (cell_checksum), a reserve area of one byte (reserved), a cell length of two bytes (length), a pointer for the address of the previous cell of two bytes (prev_ptr), and a point for the address of the next cell of two bytes (next_ptr).

In FIGS. 11 and 12, a header is formed at the top of the data of the MIC 4. As shown in FIG. 12, the header is divided into a header for a manufacture part (fields F1 to F20) and a header for a drive initialize part (fields F21 to F28). The header for the manufacture part stores manufacture information. The header for the drive initialize part stores tape information and partition information in the initialization state.

In FIG. 12, the field F1 is a check sum field for the manufacture part. The field F1 stores a check sum of the manufacture part. The check sum field F1 of the manufacture part is composed of for example one byte. The check sum of the manufacture part is obtained when the cassette is manufactured.

The check sum of the manufacture part represents a check sum for the manufacture part. Likewise, the drive initialize part has another check sum. In addition, each cell has a check sum. The life of the MIC 4 may depend on the number of times of read/write operations performed at the same position. When data of the drive initialize part is not changed and a check sum can be written to the manufacture part, the number of times of rewrite operation of the check sum is decreased. Thus, the life of the MIC can be prolonged.

The field F2 is a MIC type field. The field F2 stores the type of the MIC. The MIC type field F2 is composed of one byte. There are two types of MICs that differ in the number of pins thereof. When the MIC type field is "0", the MIC has four pins. When the MIC type field is "1", the MIC has five pins.

The field F3 is an MIC manufacture date field. The field F3 stores the date of the manufacture of the MIC. The manufacture date of the MIC is stored in the format of for example YY (year)/MM (month)/DD (day)/HH (hour). When the MIC was manufactured at 3 pm on Apr. 23, 1995, the field F3 is "95042315".

The field F4 is an MIC manufacture line name field. The field F4 stores the name of the line of the manufacture of the MIC. The field F4 is composed of eight ASCII characters (each character is composed of one byte). An ASCII character is composed of seven bits. Since eight characters are composed of (8×8 =64) bits, when one byte is composed of seven bits, nine characters can be used. Thus, the MSB of the first byte of the field F4 represents whether one character is composed of one byte or seven bits. Normally, since the MSB of each byte is "0", one character is composed of one byte and the field F4 stores eight characters. When the MSB of the first byte is "1", one byte is composed of seven bits and thereby the field F4 stores nine characters.

The field F5 is an MIC manufacture plant name field. The field F5 stores the plant name of the manufacture of the MIC. As with the MIC manufacture line name field, the manufacture plant name field is eight ASCII characters (each character is composed of one byte). Normally, since the MSB of each byte is "0", one character is composed of one byte and the field F5 stores eight characters. When the MSB of the first byte is "1", one byte is composed of seven bits and thereby the field F5 stores nine characters.

The field F6 is an MIC manufacturer name field. The field F6 stores an MIC manufacturer name. The MIC manufacturer name field is composed of eight ASCII characters (each character is composed of one byte). Normally, since the MSB of each byte is "0", one character is composed of one byte and the field F6 stores eight characters. When the MSB of the first byte is "1", one byte is composed of seven bits and thereby the field F6 stores nine characters.

The field F7 is an MIC name field. The field F7 stores a vendor name of the MIC. The MIC name field is composed of eight ASCII characters (each character is composed of one byte). Normally, since the MSB of each byte is "0", one character is composed of one byte and the field F7 stores eight characters. When the MSB of the first byte is "1", one byte is composed of seven bits and thereby the field F7 stores nine characters.

The field F8 is a cassette manufacture date field. The field FB stores the date of the manufacture of the MIC. The manufacture date of the cassette is stored in the format of for example YY (year)/MM (month)/DD (day)/HH (hour). When the cassette was manufactured at 3 pm on Apr. 23, 1995, the field F8 is "95042315".

The field F9 is a cassette manufacture line name field. The field F9 stores the line name of the manufacture of the cassette. The field F9 is composed. of eight ASCII characters (each character is composed of one byte). Normally, since the MSB of each byte is "0", one character is composed of one byte and the field F9 stores eight characters. When the MSB of the first byte is "1", one byte is composed of seven bits and thereby the field F9 stores nine characters.

The field F10 is a cassette manufacture plant name field. The field F10 stores the plant name of the manufacture of the cassette. The field F10 is composed of eight ASCII characters (each character is composed of one byte). Normally, since the MSB of each byte is "0", one character is composed of one byte and the field F10 stores eight characters. When the MSB of the first byte is "1", one byte is composed of seven bits and thereby the field F10 stores nine characters.

The field F11 is a cassette manufacturer name field. The field F11 stores the vendor name of the cassette. The field F11 is composed of eight ASCII characters (each character is composed of one byte). Normally, since the MSB of each byte is "0", one character is composed of one byte and the field F11 stores eight characters. When the MSB of the first byte is "1", one byte is composed of seven bits and thereby the field F11 stores nine characters.

The field F12 is a cassette name field. The field F12 stores the cassette name. The field F12 is composed of eight ASCII characters (each character is composed of one byte). Normally, since the MSB of each byte is "0", one character is composed of one byte and the field F12 stores eight characters. When the MSB of the first byte is "1", one byte is composed of seven bits and thereby the field F12 stores nine characters.

The field F13 is an OEM cassette name field. The field F13 stores the company name of OEM (Original Equipment Manufacturers). The field F13 is composed of eight ASCII characters (each character is composed of one byte). Normally, since the MSB of each byte is "0", one character is composed of one byte and the field F13 stores eight characters. When the MSB of the first byte is "1", one byte is composed of seven bits and thereby the field F13 stores nine characters.

The field F14 is a low format ID field. The field F14 stores physical characteristics of the tape. The physical characteristics are for example the material, thickness, length, track pitch, frame size, and the number of bytes per block of the tape.

The field F15 is a maximum clock frequency field. The field F15 stores the maximum clock frequency of the MIC. When the maximum clock frequency is 100 kHz, this field stores "100".

The field F16 is a maximum write cycle field. The field F16 stores information that represents the number of bytes that can be recorded in one write cycle. This value depends on the physical characteristics of the non-volatile memory used for the MIC.

The field F17 is an MIC capacity field. The field F17 stores the storage capacity of the non-volatile memory used for the MIC. When the storage capacity of the memory is 2048 bytes, the field stores "11" ($2048=2^{11}$).

The field F18 is a write protect top address field. The field F18 is used to write-protect a part of the area of the MIC. The write protect top address field stores the start address of the write protect area.

The field F19 is a write protect count field.

The field F19 is used to write-protect a part of the area of the MIC. The write protect count represents the number of bytes of the write-protect area. Thus, the write-protect area is from the write-protect top address stored in the field F18 to the write-protect count number stored in the field F19.

The field F20 is a reserved field. The field 20 is reserved for future use of information.

Next, the drive initialize part will be described. The information of the drive initialize part is initialized by the tape streamer drive when the tape is initially used.

The field F21 is a drive initialize part check sum field. The field F21 stores a check sum of the drive initialize part. As described above, the check sum of the manufacture part of the MIC header and the check sum of the drive initialize part are independently provided.

The field F22 is an MIC logic format field. The field F22 stores the ID number of the logic format of the MIC. Examples of the MIC format are a basic MIC format, a firmware update MIC format, a reference tape MIC format, and a cleaning cassette MIC format.

The field F23 is a volume information pointer field. The field F23 stores volume information that is a pointer that represents the storage area of information of the cassette. A volume information cell C1 is placed at the address represented by the volume information pointer. A partition information cell C5 that is a storage area of information for each partition can be accessed from the volume information pointer.

The field F24 is a user partition note pointer field. The field F24 stores a pointer that represents a storage area of data recorded on the magnetic tape 3. The field F24 is optional. As will be described later, the field F24 stores a representative one of a plurality of picture data recorded in a partition as a still picture. In addition, the field F24 stores a representative one of a plurality of audio data. When representative data is not required, the field F24 is "0". The cell C6 of the user partition note is placed at the address represented by the user information pointer. The still picture information and audio information stored in the user partition note pointer field F24 is compressed corresponding to JPEG or GIF standard.

The field F25 is an absolute volume map pointer field. The field F25 stores a pointer that represents the storage area of absolute position information. The field F25 is optional. When this information is not used, the field F25 is "0". An absolute volume map information cell C3 is placed at the address represented by the absolute volume map pointer.

The field F26 is a reserved field for future use of information.

The field F27 is a garbage cell field. The field F27 stores a pointer that represents a garbage cell. The field F27 is optional. When this information is not used, the field F27 is "0". The garbage cell C4 is placed at the address represented by the garbage pointer.

The field F28 is a comment field. The comment field F28 stores a comment. The comment is composed of 15 characters (each of which is composed of one byte). The user can freely record/reproduce information to/from the comment field F28. As an example of identifying a tape cassette, data that is same as bar code data can be stored in the comment field. Thus, from a view point of an application program that manages the tape cassette, the same identification code (bar code) can be used. Consequently, it is possible to match only a code sensing portion of the bar code system with the non-volatile memory.

Next, the structure of cells of which the positions thereof are represented by pointers will be described. The information of cells is stored in the data area of the MIC 4 in the list structure.

A cell C1 is a volume information cell. The cell C1 stores eject status information, number-of-times of initialization operation, volume information, a pointer that represents the position of a partition information cell C5, and a user volume note cell C2. The pointer of the volume note cell C2 is optional. When the volume note is absent, the pointer of the cell C2 is null. While the tape is being initialized, the eject status is reset to "0". Before the tape is unloaded, the eject status is updated.

A cell C2 is a user volume note cell. As will be described later, the cell C2 stores the relation of partitions of the tape cassette.

A cell C3 is an absolute volume map information cell. The cell C3 stores the absolute value of the count number of frames, a partition ID, the count number of groups, the count number of records, the count number of track marks, and the count number of file marks. In addition, the absolute volume map information cell C3 stores a span distance, the absolute count number of volumes, and volume map information of each span. Assuming that the span is 10 m and the absolute length of the tape is 160 m, the span distance becomes 10 and the absolute count number of the volumes becomes 16.

A cell C4 is a garbage cell. The cell C4 stores data that is not used.

A cell C5 is a partition information cell. The cell C5 stores partition history information. The partition history information includes the count number of times of the load operation for each partition and the count number of times of the access operation for each partition. In addition, the partition information cell C5 stores information of write enable, read enable, write retry enable, and read retry enable for each partition. The structure of the partition information cell C5 is the same as the structure of the system log of the system area of the above-described magnetic tape.

A cell C6 is a user partition note cell. The cell C6 stores user data for each volume.

As described above, the volume information pointer field F23 in the header of the drive initialize part designates the position of the cell C1 of the volume information. The user information pointer field F24 designates the position of the user partition note cell C6. The absolute volume map pointer field F25 designates the position of the absolute volume map information cell C3. The garbage pointer field F27 designates the position of the garbage cell C4. In such a manner, the partition information and the user information are stored in the list structure. Thus, the limited storage capacity of the MIC 4 can be effectively used.

Figure 15:
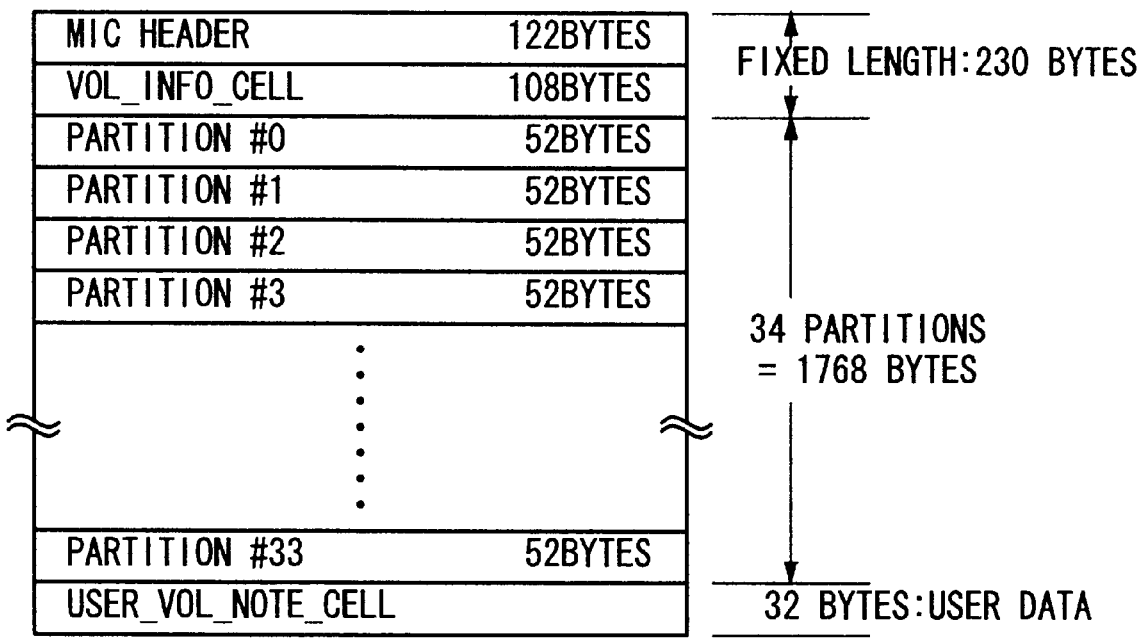
FIGS. 15 and 16 are schematic diagram for explaining a data management with a list structure.
Figure 16:
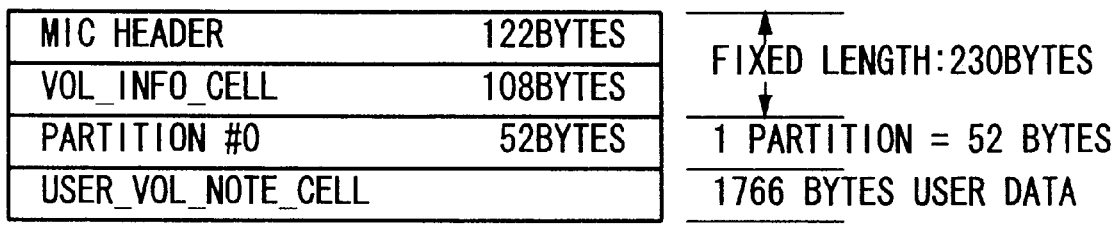

For example, when the number of partitions is changed without information of the absolute volume map and the user partition note, the area for the user volume note varies as shown in FIGS. 15 and 16. In FIG. 15, the number of partitions is 34. In this case, 122 bytes and 108 bytes are assigned to the MIC header and the volume information cell. When the number of partitions is 34, 1768 bytes are assigned to the cells for the partitions. Thus, 32 bytes can be secured as the cell for the user note. The valid data of the 32 bytes is 22 bytes.

As shown in FIG. 16, when the number of partitions is 1, 122 bytes and 108 bytes are assigned to the MIC header and the cell for the volume information, respectively. Thus, 52 bytes are assigned to the cell for the partition. Consequently, 1766 bytes can be secured as the cell for the user note. The valid data of the 1766 bytes is 1756 bytes.

Since the partition information and the user information are stored in the list structure, the number of partitions can be freely changed. In a tape streamer drive that allows the user to freely designate the number of partitions, when the number of partitions is changed, the management information of the partitions varies. With the list structure, when the number of partitions is small, the management information of the partitions can be used as the cell for the user note. Thus, the storage area can be effectively used.

When the tape cassette has the MIC 4, the partition information cell C5 that stores the history information for each partition is used. The partition information cell C5 has a structure as shown in FIG. 17.

Figure 17:
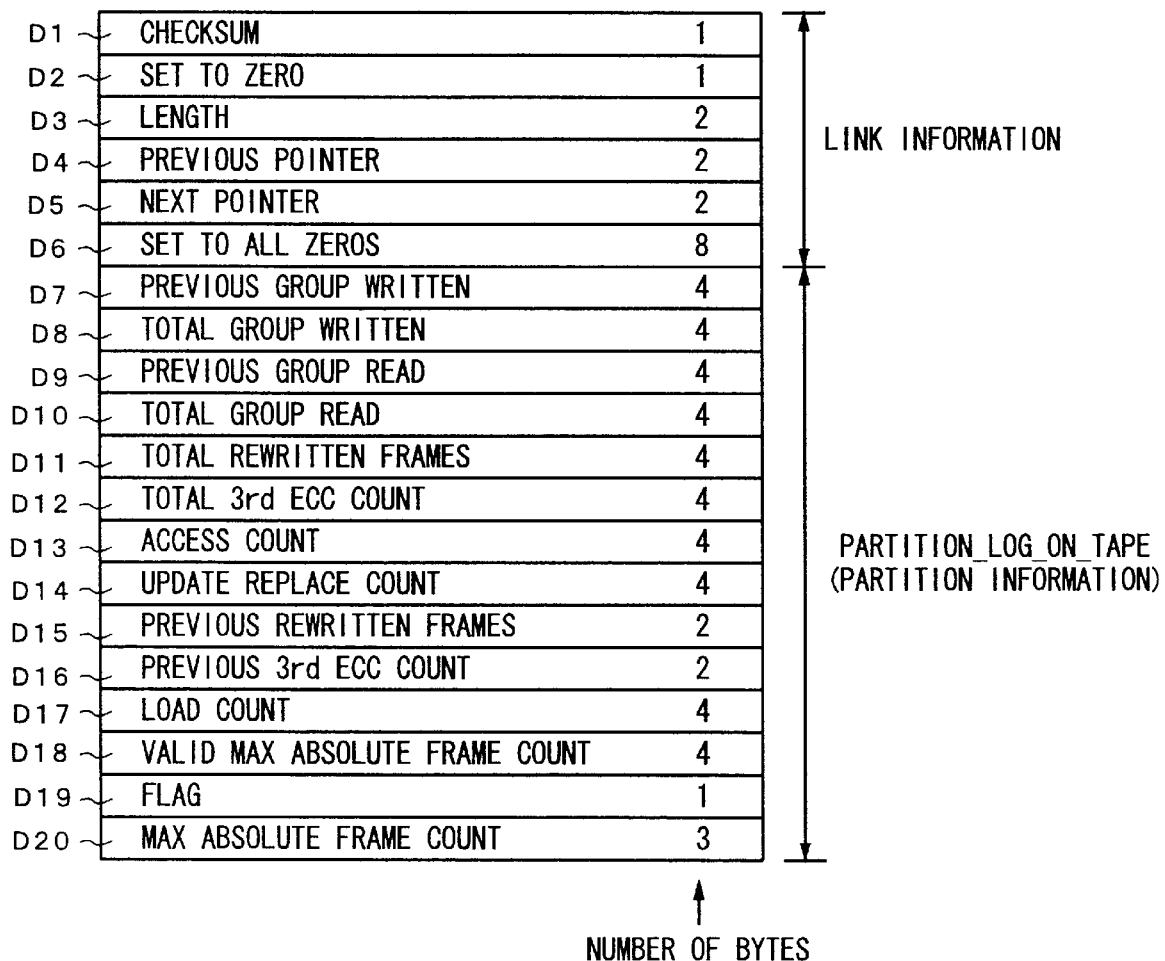
FIG. 17 is a schematic diagram for explaining partition information.

As shown in FIG. 17, a check sum D1 for the partition information is placed at the top of the cell C5. The check sum D1 is composed of one byte. An area D2 is composed of one byte. The area D2 is "0". An area D3 is composed of two bytes. The area D3 stores the length of the partition information. A previous pointer D4 stores a pointer that represents the position of the previous partition information. A next pointer D5 stores a pointer that represents the position of the cell for the next partition information. An area D6 is composed of eight bytes. The area D6 is "0". The link information is composed of the areas D1 to D6. The link information is followed by partition information.

The partition information starts with an area D7. The area D7 is a previous group written area. An area D8 is a total group written area. The previous group written area D7 represents the number of groups in a partition that have been physically recorded on the magnetic tape after the system area has been updated last time. An area D8 is a total group written area. The total group written area D8 represents the number of groups written in a partition after the partition has been written first time.

An area D9 is a previous group read area. An area D10 is a total group written area. The previous group read area D9 represents the number of groups read from a partition after the system area has been updated last time. The total group written area D10 represents the number of groups read from a partition after the partition has been written first time.

These values are cumulated as long as the tape cassette is used. When data is being recorded to the magnetic tape by the tape streamer drive, the values of the areas are incremented corresponding to the number of groups that are newly recorded in the current record operation under the control of the system controller 15.

An area D11 is a total written frame area. The total written frame area D11 represents the number of frames of a partition that should be rewritten.

In the recording mode, after the recording heads 12A and 12B have written data to frames of the magnetic tape, the reproducing heads 13A and 13B read data from the same frames so as to determine whether or not an error has taken place. In other words, read-after-write operation is performed. When an error has taken place, the recording heads 12A and 12B rewrite the same data to the relevant frames. The total rewritten frame area D11 stores the cumulative value of frames rewritten corresponding to the read-after-write operation.

An area D12 is a total 3rd ECC count area. The total 3rd ECC count area D12 represents the number of groups of data that cannot be restored unless C3 correcting method is used.

In this system, an error correcting process is performed with C1, C2, and C3 parities. The C3 parity is used when data cannot be restored with the C1 and C2 parities. The total 3rd ECC count area D12 represents a cumulative value of groups that have been error-corrected with the C3 parity in a partition.

An area D13 is an access count area. The access count area D12 represents the number of times of the access operation for a partition. The access operation includes the read operation, the write operation, and the passage of the partition on the tape.

An area D14 is an update replace counter area D14. The update replace count area D12 represents the number of times of the update write operation for a partition.

An area D15 is a previous rewritten frame area D15. An area D16 is a previous 3rd ECC count area D16. An area D17 is a load count area. The previous rewritten frame area D15 represents the number of frames in a partition that have been rewritten after the system log area has been updated last time corresponding to the read-after-write operation. The previous 3rd ECC count area D16 represents the number of times of the error correction operation with the C3 parity after the system area has been updated last time. The load count area D17 represents the number of times of the load operation of the tape.

An area D18 is a valid maximum absolute frame counter area. The valid maximum absolute frame counter area D18 represents the number of frames that are valid in a partition. An area D19 is a flag for write prohibit, read prohibit, write retry prohibit, and read retry prohibit. An area D20 is a maximum absolute frame count area. The maximum absolute frame count area D18 represents the number of frames of the last data in a partition.

As described above, the partition information cell recorded in the data area of the MIC 4 has link information formed in the list structure. Thus, the address of the partition information cell for each partition can be obtained with the link information. Consequently, the address of the partition information for each partition can be freely designated. As a result, the memory space can be effectively used.

In other words, the work area of the firmware of the tape streamer drive is limited. Thus, it is wasteful to copy the partition information of all partitions to the work area. Only the address of each partition information may be stored in the work area. However, in this case, the work area for the addresses is required. On the other hand, when link information is stored in the above-described manner, the pointer for the first list is stored in the header of the MIC. The next partition information can be accessed with the link information. Thus, it is not necessary to store even addresses.

In the example, both the next pointer D5 that represents the address of the next partition information cell and the previous pointer D4 that represents the address of the information of the previous partition information cell are provided. With at least the next pointer that represents the address of the next partition, the partition information cell of a target partition can be accessed. However, in this case, depending on the relation between the cell number of current partition information and the cell number of target partition information, the cell of the target partition information cannot be effectively accessed.

On the other hand, in the case that the next pointer D5 and the previous pointer D4 are provided, a cell for target partition information can be accessed from a cell for target partition information through a root (the first pointer of the list). Alternatively, a cell for target partition information can be accessed from a cell for current partition information. In any case, a cell for partition information with a desired partition number can be effectively accessed.

Figure 18A:
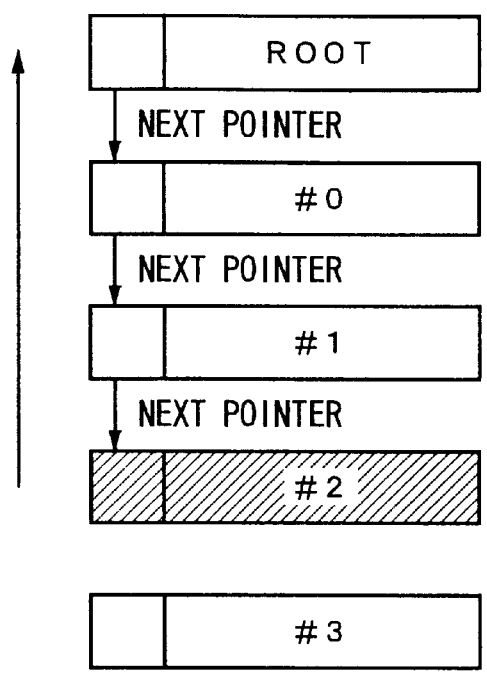
FIGS. 18A and 18B are schematic diagrams for explaining pointers.
Figure 18B:
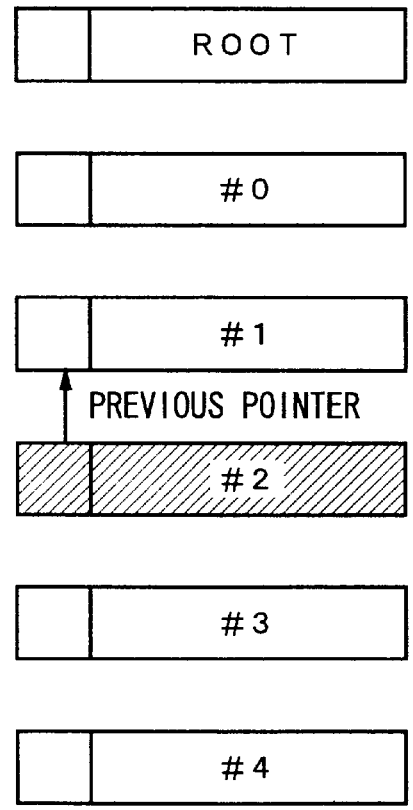

In other words, as shown in FIGS. 18A and 18B, assume that partition information with the partition #2 is stored in the work memory and that partition information with the partition #1 is accessed. In this case, as shown in FIG. 18A, when only the next pointer is used, after the root is accessed, the cell for the partition information with the partition #0 is accessed. Thereafter, the cell for the partition information with the partition #1 is accessed with link information of the partition #0.

Figure 20:
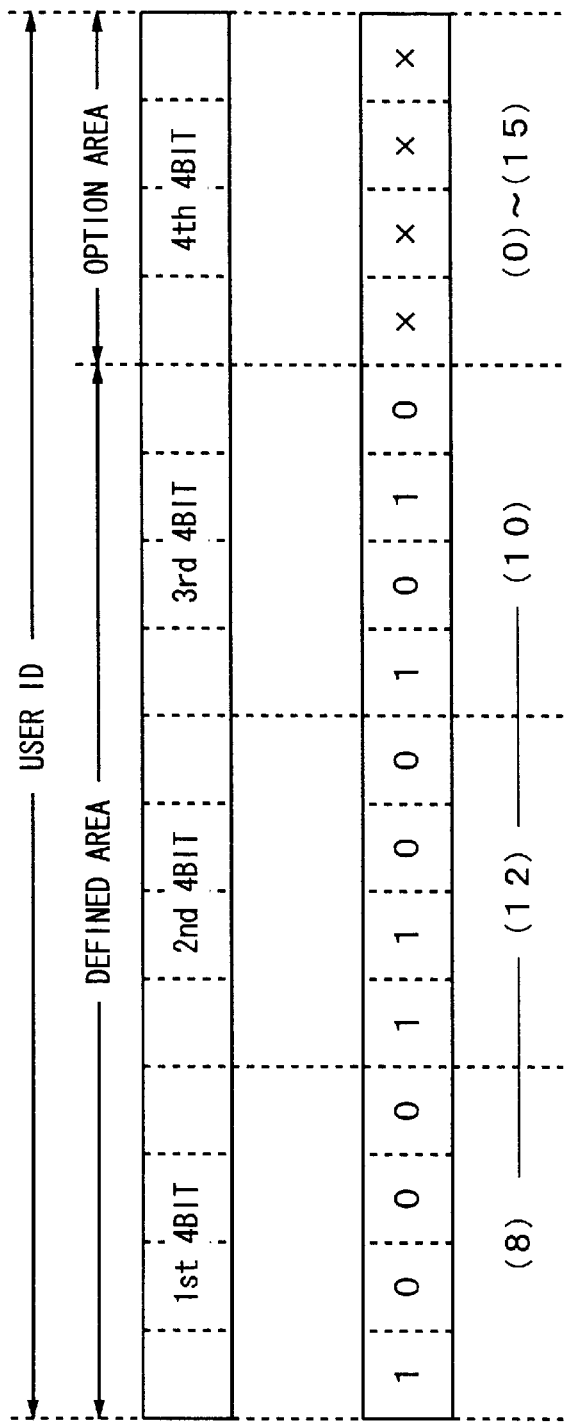

On the other hand, as shown in FIG. 20B, in the case that the previous pointer D4 is provided along with the next pointer D5, the cell for partition information with the target partition #1 can be accessed from the cell for the partition information with the current partition #2 in one operation.

In the case that the number of partitions increases, when a cell for partition information with a target partition number is accessed from a cell for partition information with a current partition number, it is necessary to determine whether the path from the cell for the partition information with the current partition number to the cell for the partition information with the target partition number is shorter than the path from the cell for the partition information with the current partition number to the cell for the partition information with the target partition number through the root. Such a determination is accomplished by a process depicted by the flowchart shown in FIG. 19.

Figure 19:
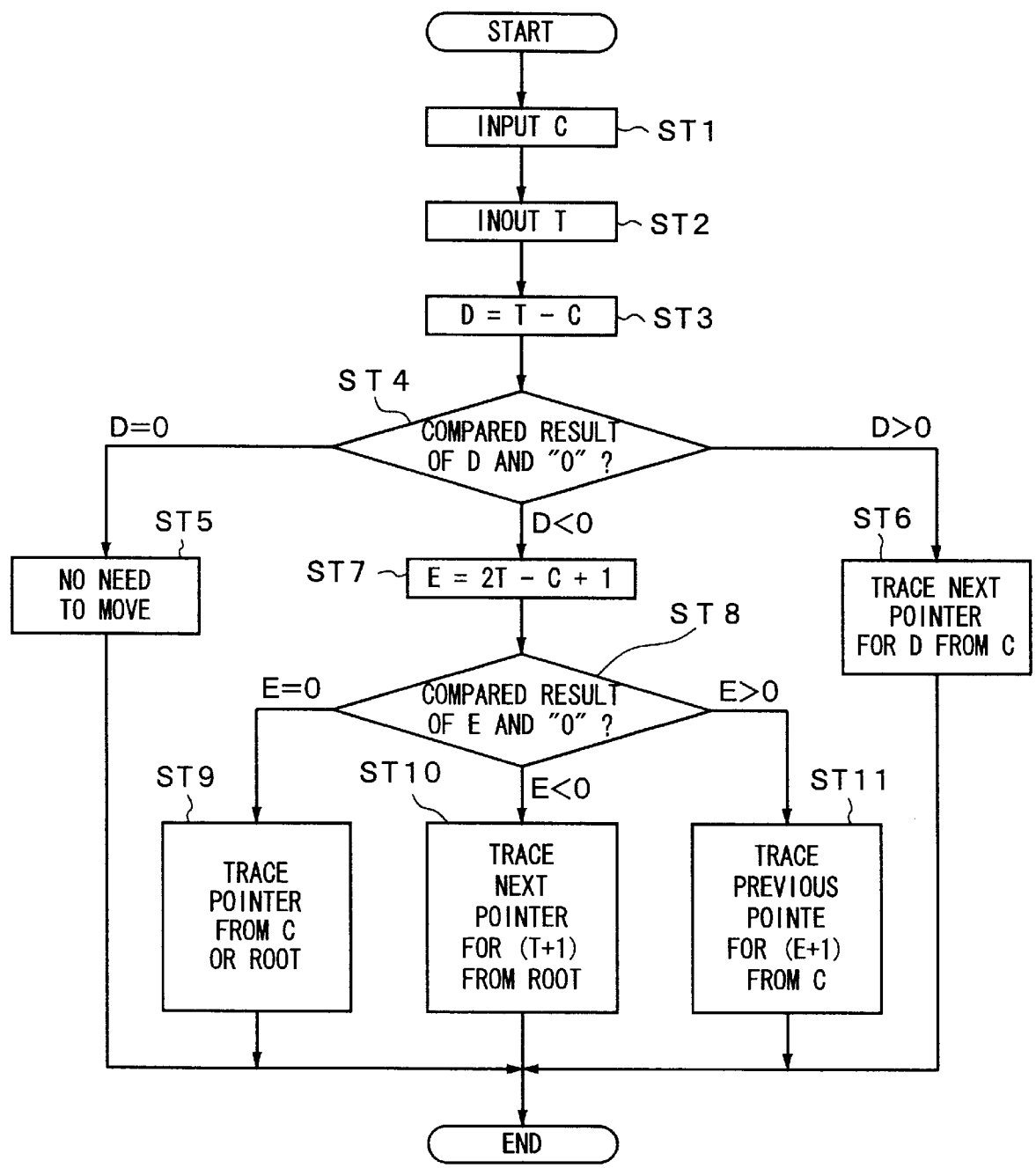
FIG. 19 is a flow chart for explaining a pointer.

In FIG. 19, the user inputs a partition number C of a cell for current partition information (at step ST1). Next, the user inputs a partition number T of a cell for target partition information (at step ST2).

The tape streamer drive subtracts the partition number C of the cell for the current partition information from the partition number T of the cell for the target partition information and obtains a value D (T−C=D) (at step ST3).

The tape streamer drive determines whether or not the value D is larger than "0" (at step ST4). When the value D is "0", since the partition number C of the cell for the current partition information accords with the partition number T of the cell for the target partition information, the tape streamer drive does not need access a cell (at step ST5).

When the value D is larger than "0", the tape streamer drive accesses the cell for the partition information with the target partition number T from the partition number C of the cell for the current partition information with D next pointers (at step ST6).

When the value D is smaller than "0", the tape streamer drive obtains a value E (2T−C+1) (at step ST7). Thereafter, the tape streamer drive determines the value E is larger than "0" (at step STB).

When the value E is "0", since the distance of the path from the partition number C of the cell for the current partition information to the cell for the partition information with the target partition number T is the same as the distance of the path from the cell for the current partition information with the partition number T to the cell for the partition information with the target partition number T through the root, the tape streamer drive can access the cell with the target number T from the cell with the partition number C or through the root (at step ST9).

When the value E is smaller than "0", the tape streamer drive forwardly accesses the cell for the partition information with the target partition number T through the root with (T+1) next pointers (at step ST10).

When the value E is larger than "0", the tape streamer drive backwardly accesses the cell for the partition information with the target partition number T from the cell for the partition information with the current partition number C using (E+1) previous pointers (at step ST11).

Next, the user partition note will be described. As shown in FIGS. 11 and 12, the user partition note cell C6 stores a user's comment for each partition. The user partition note cell C6 is composed of a plurality of cells C6a for individual partitions on the magnetic tape. Each of the cells C6a stores identification information (user identification) that identifies the user (vendor) who is a data provider and the type of the tape streamer driver.

As shown in FIG. 20A, the user ID is 16-bit fixed data. The 16-bit data is divided into four 4-bit blocks. The first to third blocks (composed of 12 bits) are treated as a "definition area". The fourth block (four bits) is treated as an "optional area".

Assuming that there are many users for the data storage system, unique ID numbers corresponding to the users are designated in advance. The "definition area" is an area for designating a value corresponding to the ID number for each user. The "optional area" is an area used for each user.

An ID number is designated by a combination of three numbers of the first to third blocks. Assuming that an ID number "8-12-10" is designated, the user ID is designated as shown in FIG. 20B.

As shown in FIG. 20B, the optional area is an area used by the user with the ID number. Thus, in FIG. 20B, each bit of the optional area is denoted by "x". Predetermined information can be designated to numbers 0 to 15 of the optional area.

FIG. 21 shows a real example of an ID number of a user ID. As described above, an ID number is designated by a combination of three numbers corresponding to values of the first to third blocks.

When the values of the first to third blocks of the ID number are "0-0-0", the ID number is treated as "common". For example, data recorded in the partition is general data of which a user is not limited. In other words, in the case that the tape streamer drive supplies data to the host computer, when a partition of the data has such a user ID, the host computer can deal with data in the partition.

In this example, an ID number "0-0-1" is designated as "ASCII text". An ID number "1-5-2" is designated as a user ID of company A. An ID number "1-5-3" is designated as a user ID of company B. In other words, a user ID is not designated to a vendor, a manufacturer, or the like that is called a user. Instead, a data standard can be treated as a user. Thus, an ID number can be designated to a data standard.

A definition ID number is composed of a combination of three numbers of the first to third blocks. Thus, ID numbers can be hierarchically categorized and defined.

In other words, with the first block, 16 user groups can be categorized. Each of the user groups categorized with the first block is further categorized with the second block. Each of the user groups categorized with the second block is further categorized with the third block. Thus, each user can be identified.

Thus, ID numbers can be uniquely designated to individual users. Thus, with 16 bits, many users can be identified.

Since user IDs are stored corresponding to lists for individual partitions, when users of individual partitions of one magnetic tape are different from each other, respective IDs can be designated. In this case, since user IDs can be uniquely designated, the host computer can securely identify the user of each partition. Thus, data of a user with which the host computer cannot deal can be prevented from being mistakenly processed. In addition, the user side can securely contain spacial data management information such as copy protect information in record data assuming that the host computer side can securely identify users. Moreover, since ID numbers are hierarchically defined, they can be easily managed.

Figure 22:
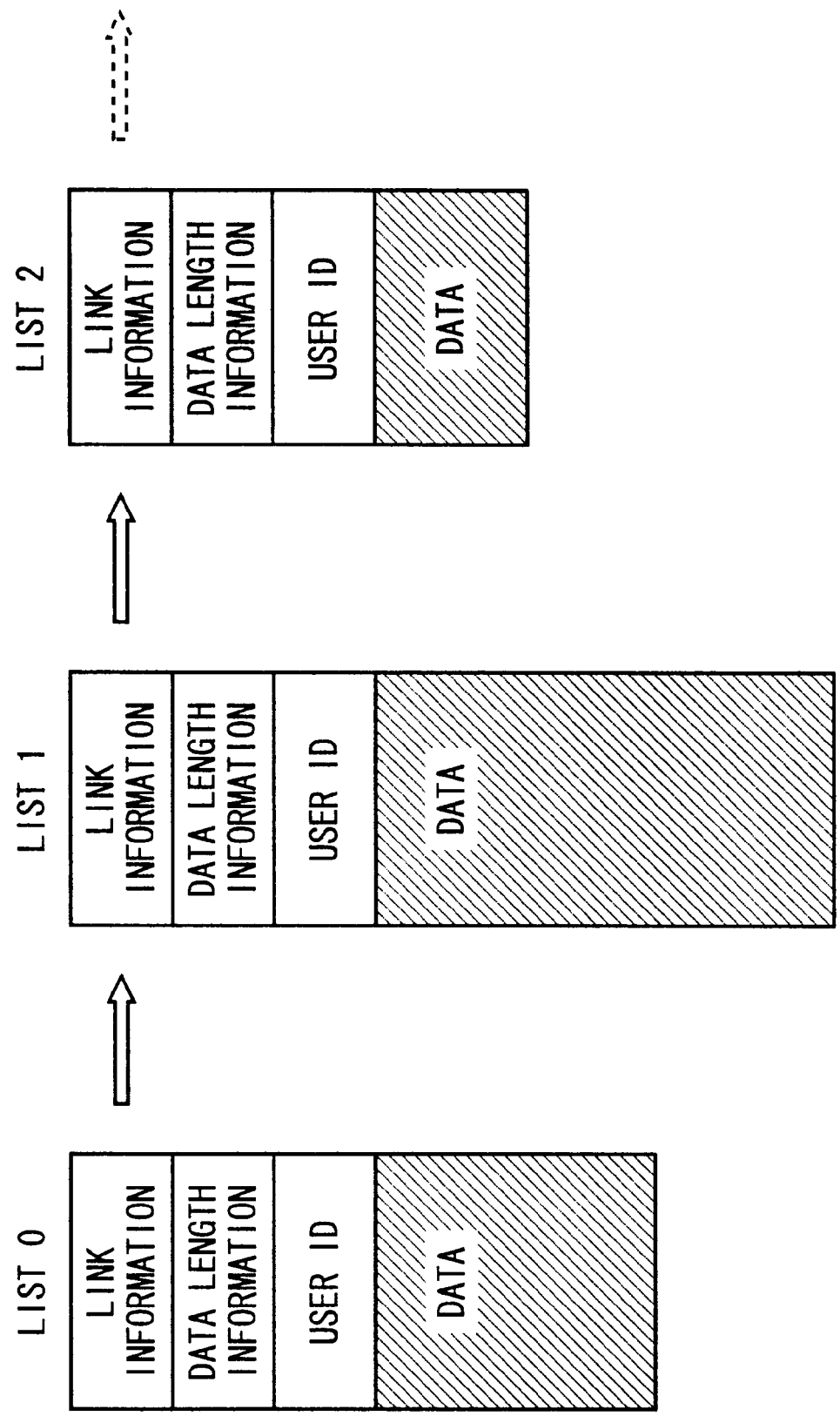
FIG. 22 is a schematic diagram for explaining a user ID.

FIG. 22 is a schematic diagram showing the data structure of a user partition note cell. The user partition note is formed in a list structure. Normally, lists are created for respective partitions. As shown in FIG. 22, a user partition note cell stores link information, data length information, a user ID, and a variable-length user data area. The link information is a pointer that represent the address of the list to be linked next. The data length information represents the data length of the user data area. The user ID area stores user ID data. With the user ID data, a user can be identified.

Next, the user volume note will be described. In FIGS. 11 and 12, the user volume note cell C2 stores information of partitions.

For example, when information such as a TV commercial is recorded in the tape cassette, commercial information is categorized as genres and stored in respective partitions. Picture information of a representative still picture of each genre and audio information of a representative sound of each genre can be stored in the user partition note. Next, a process for managing such picture information and audio information will be described with reference to a flow chart shown in FIG. 23.

Figure 23:
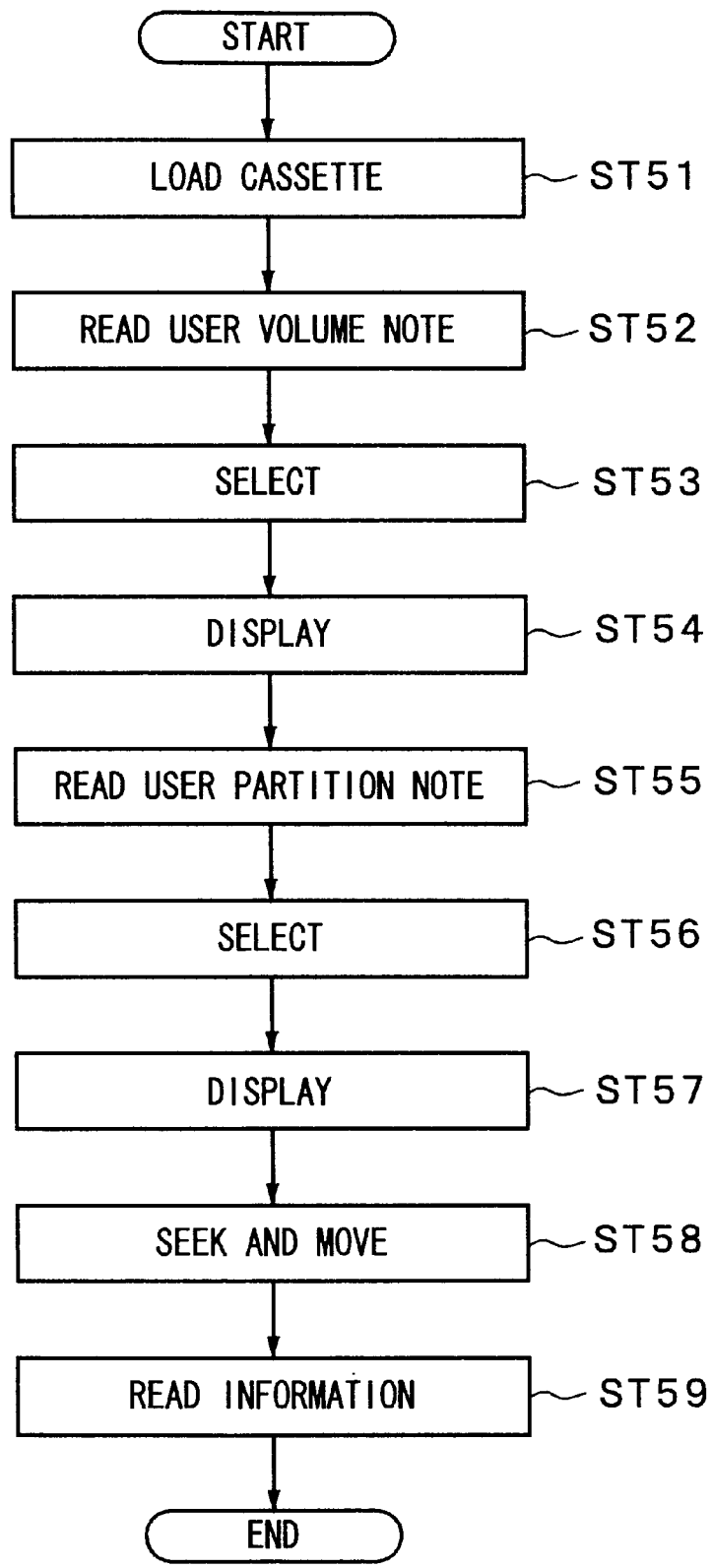
FIG. 23 is a flow chart for explaining a user volume note.
Figure 24:
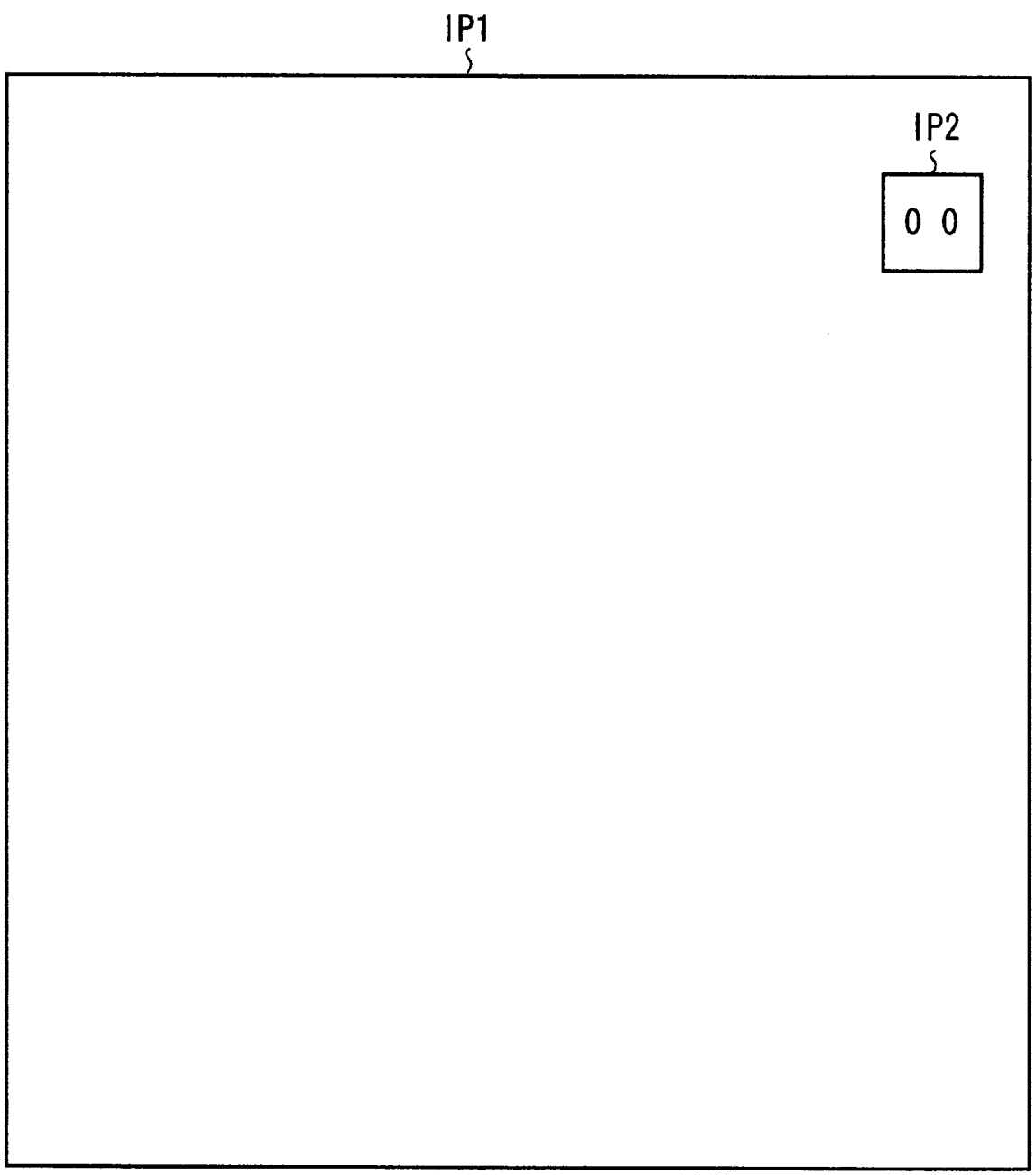
FIGS. 24, 25, and 26 are schematic diagrams for explaining a user volume note.

At step ST51 shown in FIG. 23, a tape cassette is loaded to the tape streamer drive. At step ST52, the tape streamer drive reads management information of the MIC 4 of the tape cassette. In reality, when the tape cassette is loaded, as shown in FIG. 24, the tape streamer drive obtains the management information of the MIC and outputs a screen IP1 to a display that is a user interface. In addition, the tape streamer drive outputs a tape volume of the tape cassette as an icon IP2.

Figure 25:
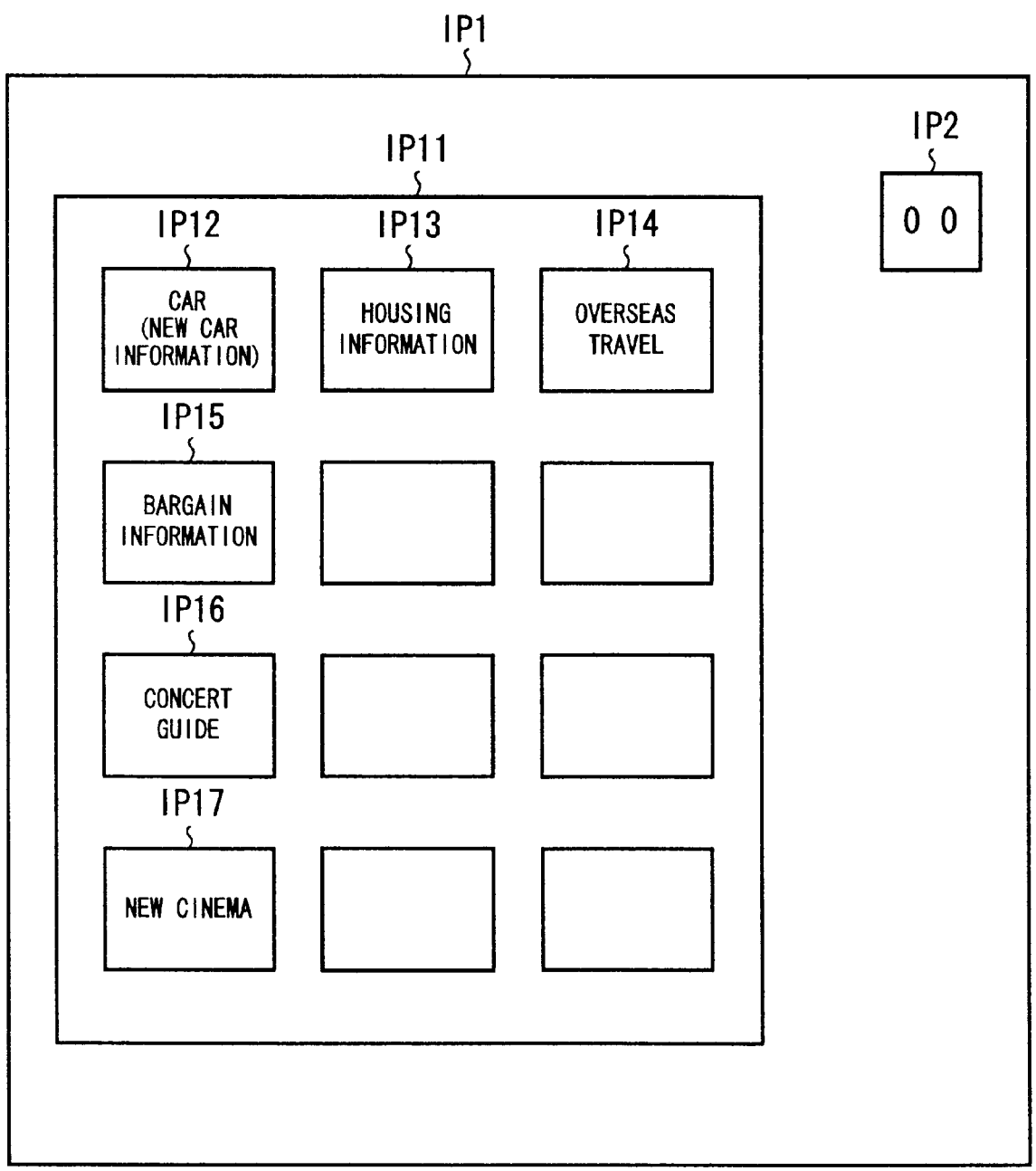

At step ST53, the tape streamer drive outputs a category (partition) of the tape cassette. In other words, as shown in FIG. 25, when the user clicks the icon IP2 of the tape volume with the mouse, the tape streamer drive outputs a screen IP11. The screen IP11 contains categories (partitions) of the tape cassette. In this example, the categories of the screen IP11 are a car (new car information) IP12, housing information IP13, overseas travel IP14, bargain information IP15, concert guide IP16, and new cinema IP17.

Figure 26:
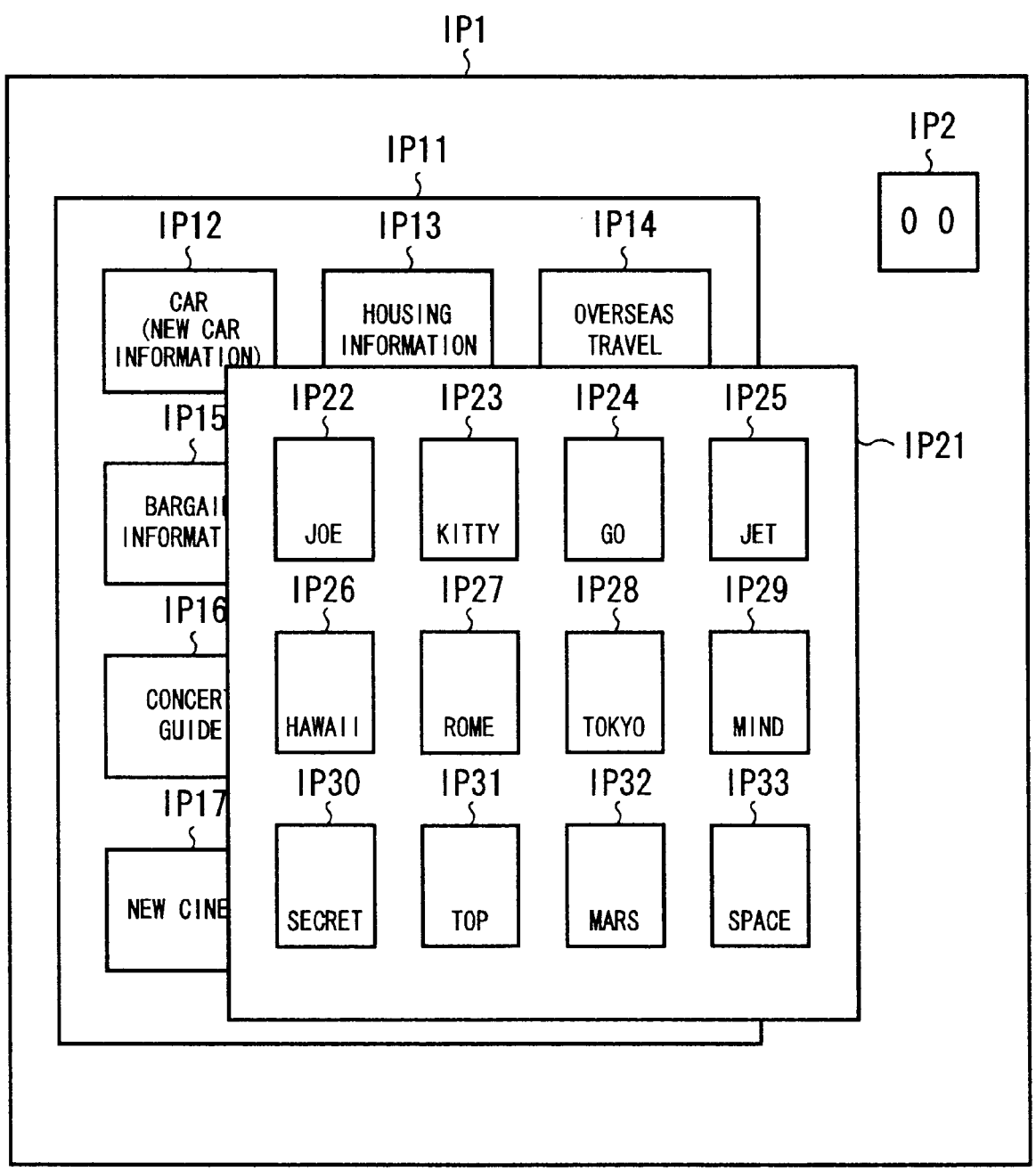

At step ST54, the user selects one of the categories shown in FIG. 25. For example, the user clicks the icon for the new cinema IP17 with the mouse or the like. At step ST55, the tape streamer drive reads a cell for a user partition note corresponding to the selected category (partition) corresponding to link information. At step ST56, the tape streamer drive outputs information stored in the user partition note cell corresponding to the new cinema IP17 on the display. In reality, as shown in FIG. 26, the tape streamer drive outputs one scene (still picture) of commercials of new movies to display.

For example, the commercials of the new cinema IP17 are Joe IP22, Kitty IP23, Go IP24, jet IP25, Hawaii IP26, Rome IP27, Tokyo IP28, Mind IP29, Secret IP30, Top IP31, Mars IP32, and Space IP33. At step ST57, the user selects one of the commercials being displayed. At step ST58, the tape streamer drive searches a block corresponding to the selected commercial from a relevant partition and moves the magnetic tape 3 to the searched block position. At step ST59, the tape streamer drive reads the selected commercial. In other words, the tape streamer drive reads the picture information (moving picture) and the audio information of the commercial.

Next, the initialize operation for the MIC 4 and the magnetic tape 3 of the tape cassette will be described.

Figure 27:
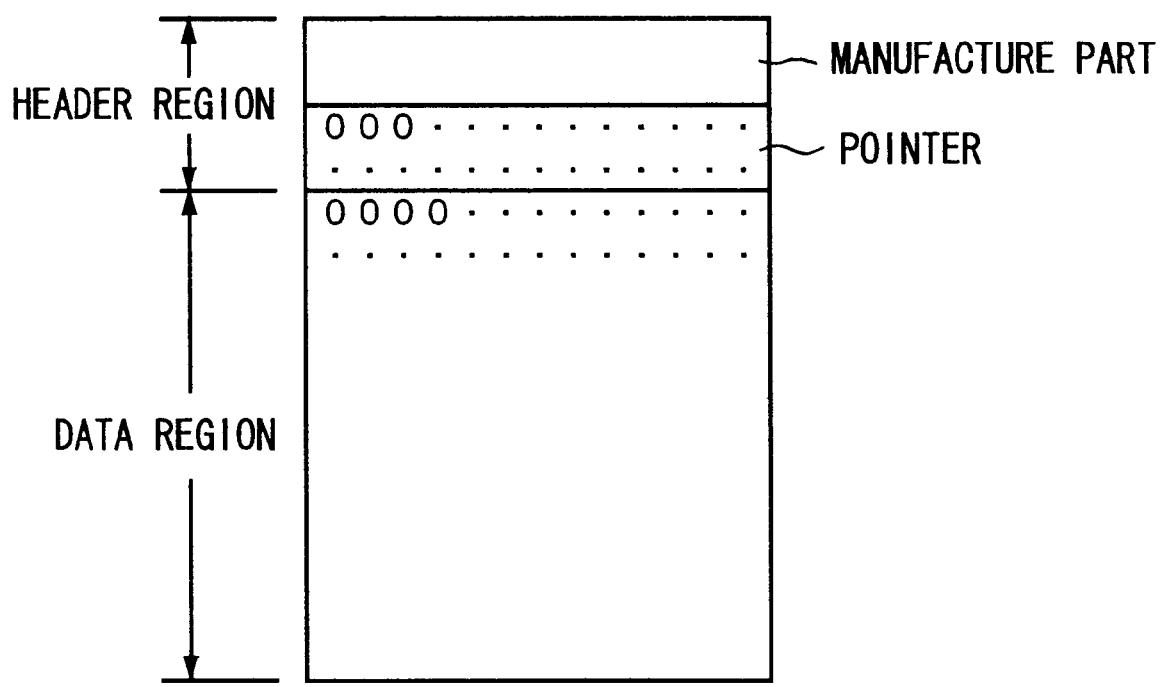
FIG. 27 is a schematic diagram for explaining an initialization of an MIC.

As shown in FIG. 27, when the tape cassette is shipped from the factory, manufacture information and serial number have been written to the manufacture part of the header of the MIC 4 and "00h" has been written to other areas thereof.

Figure 28:
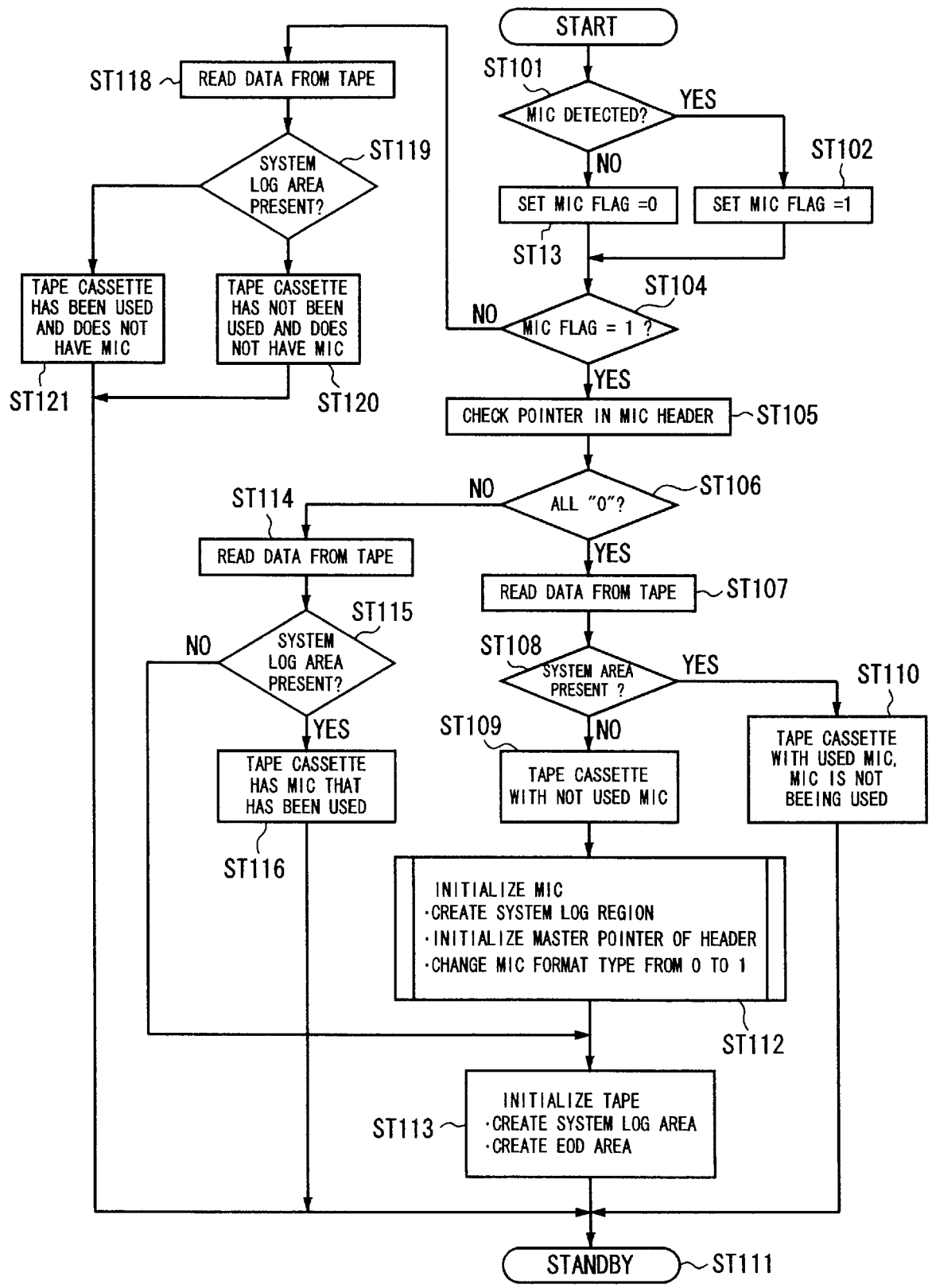
FIGS. 28 and 29 are flow charts for explaining an initialization of an MIC.

When the tape cassette is loaded to the tape streamer drive, the process as shown in FIG. 28 is performed. When the tape cassette has the MIC that has not been used, the tape streamer drive initializes the MIC 4 and forms a system area on the magnetic tape 3. When the tape cassette does not have the MIC 4, the tape streamer drive forms a system area on the magnetic tape 3.

In FIG. 28, when the tape cassette is loaded to the tape streamer drive, the tape streamer drive determines whether or not the tape cassette has the MIC 4 (at step ST101). As described earlier, this determination is performed by supplying a clock signal to the clock signal input terminal 5C and detecting a reply signal therefrom.

When the determined result at step ST101 is Yes, the MIC flag is set to "1" (at step ST102). When the determined result at step ST101 is No, the MIC flag is set to "0" (at step ST103).

The tape streamer drive determines whether or not the MIC flag is "1" (at step ST104). When the determined result at step ST104 is Yes, the tape streamer drive checks for data of other than the manufacture part of the header area of the MIC (namely, pointers of the drive initialize part of the MIC header area and data of the data area) (at step ST105).

When the tape cassette is shipped from the factory, all data other than the manufacture part of the header area has been set to "0". Thus, when data other than the manufacture part is checked, it can be determined whether or not the tape cassette has been used.

The tape streamer drive determines whether or not all data other than the manufacture part of the header area of the MIC is "0" (at step ST106). When the determined result at step ST106 is Yes, the tape streamer drive reads data from the magnetic tape 3 (at step ST107). Thereafter, the tape streamer drive determines whether or not the magnetic tape 3 has a system area (at step ST108).

When the tape cassette is shipped from the factory, since all data other than the manufacture part of the header area has been initialized to "0", when the determined result at step ST106 is Yes, the tape cassette has the MIC that has not been used or the MIC (that has been used) of the tape cassette is not being used.

When the tape cassette has the MIC 4 that has not been used, the magnetic tape has not been used. Thus, the tape must have the system area.

When the determined result at step ST108 is No, the tape streamer drive determines that "the tape cassette has the MIC 4 that has not been used" (at step ST109). When the determined result at step ST108 is Yes, the tape streamer drive determines that "although the tape cassette has the MIC 4 that has been used, the MIC 4 is not being used". The tape streamer drive stores the determined result (at step ST110). Thereafter, the tape streamer drive enters a standby state (at step ST111).

When the tape streamer drive determines that "the tape cassette has the MIC 4 that has not been used", it initializes the MIC 4 (at step ST112). In other words, the tape streamer drive creates a list in the data area of the MIC 4, initializes pointers in the header area, and sets the MIC format type to "1".

Thereafter, the tape streamer drive initializes the magnetic tape 3 (at step ST113), creates a system log area and an EOD area, and enters the standby state (at step ST111).

When the determined result at step ST106 is No, the tape cassette must have the MIC 4 that has been used. Thus, the tape has been used and thereby the magnetic tape 3 must have the system area.

When the determined result at step ST106 is No, the tape streamer drive reads data from the magnetic tape 3 (at step ST114). The tape streamer drive determines whether or not the system log of the system area of the magnetic tape 3 is present (at step ST115). When the determined result at step ST115 is Yes, the tape streamer drive determines that "the tape cassette has the MIC 4 that has been used" (at step ST116) and enters the standby state (at step. ST111).

When the determined result at step ST115 is No, although the tape cassette has the MIC 4 that has been used, the magnetic tape 3 has not been correctly initialized. Thus, the tape streamer drive treats the tape cassette as an NG cassette. The flow advances to step ST113. At step ST113, the tape streamer drive creates the system log area and the EOD area on the magnetic tape 3.

When the determined result at step ST104 is No, the tape cassette does not have the MIC 4 that has not been or the tape cassette does not have the MIC 4 that has been used. When the tape cassette has been used, since the tape has been used, the magnetic tape 3 must have the system area.

When the tape cassette has not been used, since the tape has not been used, the magnetic tape 3 must not have the system area.

When the determined result at step ST104 is No, the tape streamer drive reads data from the tape (at step ST118). Thereafter, the tape streamer drive determines whether or not the system log of the system area of the magnetic tape 3 is present (at step ST119). When the determined result at step ST119 is No, the tape streamer drive determines that "the tape cassette has not been used and does not have the MIC 4" (at step ST120) and enters the standby state (ST111). When the determined result at step ST119 is Yes, the tape streamer drive determines that "the tape cassette has been used and do not have the MIC 4" (at step ST121) and enters the standby state (at step ST122).

Figure 29:
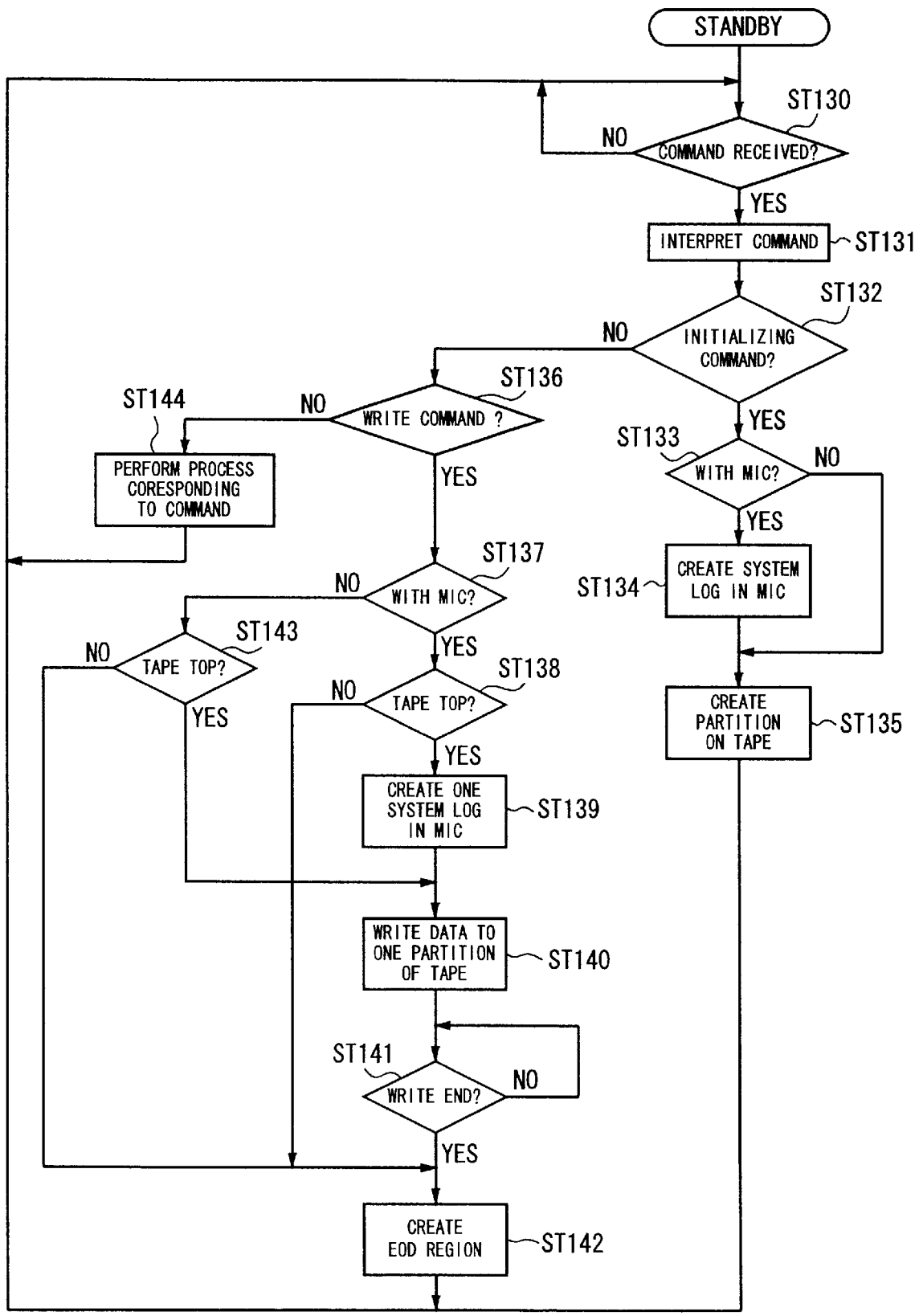

As shown in FIG. 29, in the standby state, the tape streamer drive waits for a command from the host computer (at step ST130). When the tape streamer drive has received a command from the host computer, the tape streamer drive determines the type of the received command (at step ST131).

When the received command is an initialize command (at step ST132), the tape streamer drive determines whether or not the tape cassette has the MIC 4 (at step ST133). When the determined result at step ST133 is Yes, the tape streamer drive initializes the MIC 4 corresponding to the initialize command (at step ST134). In other words, with the initialize command, the tape streamer drive designates the number of partitions and the capacity of each partition. Corresponding to the initialize command, the tape streamer drive initializes each partition. At this point, the tape streamer drive creates partition information lists corresponding to the number of the partitions in the data area of the MIC and stores pointers thereof in the header. Each partition information list stores history information of each partition.

Corresponding to the initialize command, the tape streamer drive initializes the magnetic tape 3 (at step ST135). In other words, the tape streamer drive divides the magnetic tape 3 into a plurality of partitions corresponding to the designated number of partitions and creates a system area in each partition. Thereafter, the flow returns to step ST130.

When the determined result at step ST133 is No, the flow advances to step ST135. At step ST135, the tape streamer drive initializes the magnetic tape 3 corresponding to the initialize command. Thereafter, the flow returns to step ST130.

When the determined result at step ST132 is No, the tape streamer drive determines whether or not the received command is a write command (at step ST136). When the determined result at step ST136 is Yes, the tape streamer drive determines whether or not the tape cassette has the MIC 4 (at step ST137). When the determined result at step ST137 is Yes, the tape streamer drive determines whether or not the top position of the magnetic tape 3 has been detected (at step ST138). When the determined result at step ST138 is Yes, the tape streamer drive interprets the command as "initialize the tape with one partition and write data thereto". At this point, the tape streamer drive clears all data of the MIC 4 and creates one list of the system log (at step ST139).

The tape streamer drive writes and records data with one partition on the magnetic tape 3 (at step ST140). Thereafter, the tape streamer drive determines whether or not the data has been completely recorded (at step ST141). When the determined result at step ST141 is Yes, the tape streamer drive creates an EOD area (at step ST142). Thereafter, the flow returns to step ST131.

When the determined result at step ST137 is No, the tape streamer drive determines whether or not the top position of the tape has been detected (at step ST143). When the determined result at step ST143 is Yes, the flow advances to step ST140. The tape streamer drive writes data with one partition (at step ST140). After the tape streamer drive has completely recorded the data (at step ST141), it creates an EOD area on the tape (at step ST142). Thereafter, the flow returns to step ST131.

When the determined result at step ST136 is No, the tape streamer drive performs a process corresponding to the received command (at step ST143).

Next, the accessing process of the tape streamer drive to the magnetic tape in the record/reproduce mode will be described.

A tape cassette that does not have the MIC 4 may be loaded to the tape streamer drive. Thus, the tape streamer drive has a compatibility for recording/reproducing data to/from a tape cassette regardless of whether or not it has the MIC 4. First, an example of the process of the tape streamer drive in the case that the tape cassette that does not have the MIC 4 will be described.

Figure 30:
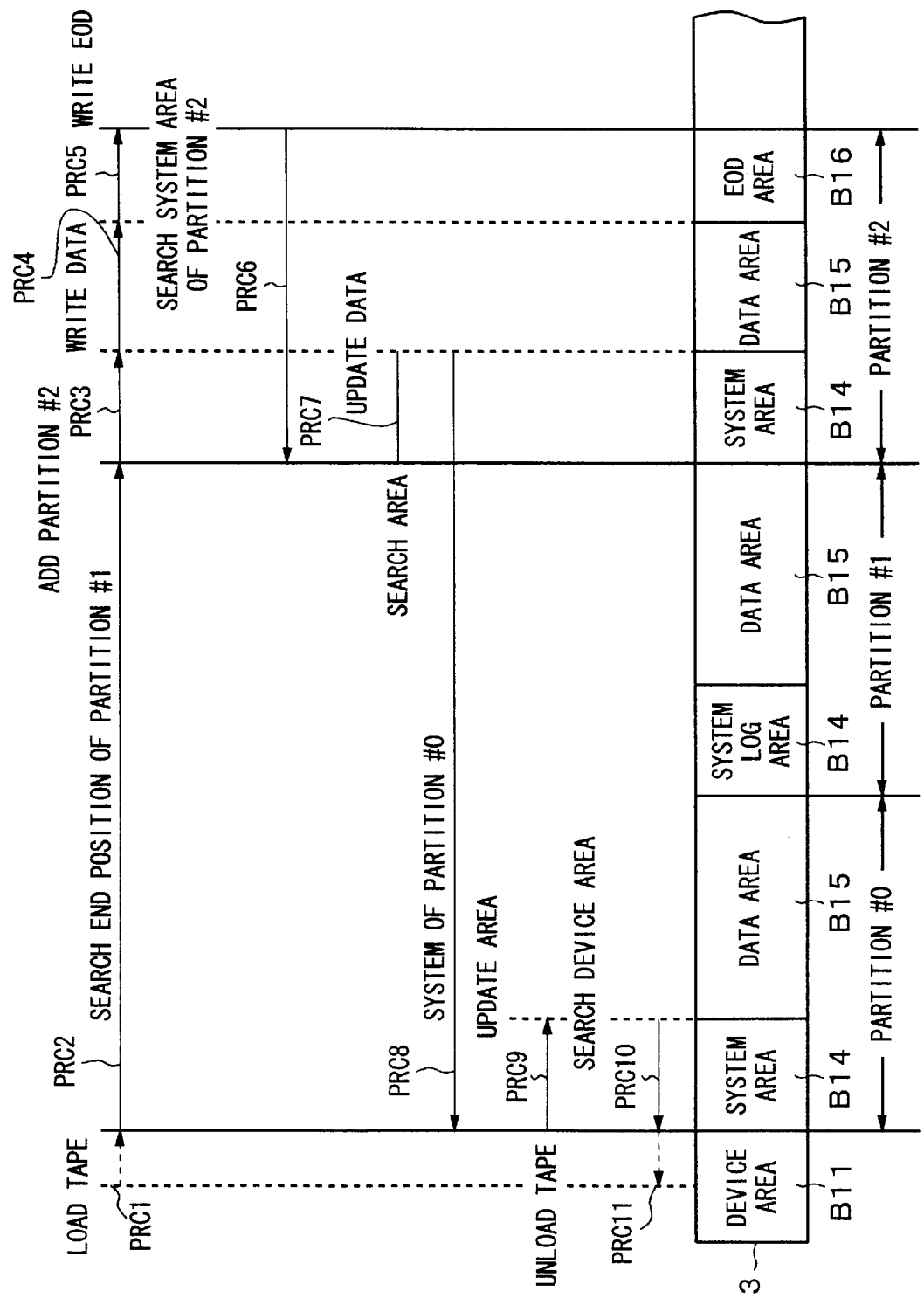
FIGS. 30 and 31 are schematic diagrams for explaining a process of a tape streamer drive according to the present invention.

As shown in FIG. 30, an example of the process for appending a new partition #2 to the magnetic tape 3 on which partitions #0 and #1 have been recorded will be described.

When the tape cassette does not have the MIC 4, the tape streamer drive must load the magnetic tape 3 from the device area B11 at the beginning thereof (at step PRC1). Thereafter, the tape streamer drive searches the last end position a partition #1 of the tape at high speed (at step PRC2).

Next, the tape streamer driver creates a system log area B14 for a partition #2 (at step PRC3). The system area B14 has a system log. The data contents and data structure of the system log are the same as those of the system log area of the partition information cell of the MIC 4.

After the tape streamer drive has completely written the system area B14 of the partition #2, it writes data (at step PRC4). Thus, a data area B15 is formed after the system area B14.

After the tape streamer drive has completely written the data, it writes an EOD area B16 (at step PRC5). After the tape streamer drive has completely written the EOD area B16, it determines that there is other valid data areas on the magnetic tape 3.

In such a manner, the tape streamer drive has successively written the system area B11, the data area B15, and the EOD area B16 of the partition #2. Thereby, the area of the partition #2 has been physically formed.

After the tape streamer drive has completely written the EOD area, it searches the top position of the system area B14 of the partition 32 (at step PRC2). The tape streamer drive changes the system log in the system area B14 of the partition #2 corresponding to the data area written at step PRC4 and the EOD area written at step PRC5.

When the tape streamer drive records/reproduces data to/from the tape cassette that does not have the MIC 4, it manages the process history information for all the partitions recorded on the magnetic tape rather than the history information of the partition #0. Thus, after the tape streamer drive has updated the system log of the partition #2, it accesses the top position of the partition #0 from the position of the system log (at step PRC8). After the tape streamer drive has updated the system log of the system area B14 of the partition #0 (at step PRC9), it accesses the device area B11 at the top of the magnetic tape 3 (at step PRC10) and performs an unload operation (at step PRC11).

In the case that the tape cassette does not have the MIC 4, the accessing process of the tape streamer drive in the reproducing mode is similar to that in the recording mode.

In other words, the tape streamer drive accesses the system log of the system area of the partition #0 and reads the system log. Thereafter, the tape streamer drive accesses the system log of the system area of a target partition and reads the system log. Next, the tape streamer drive accesses the current partition and reads data thereof. Thereafter, the tape streamer drive updates the system log of the current partition, accesses the system area B14 of the partition #0, updates the system log, and unloads the tape from the device area B11.

In the accessing process of the tape streamer drive to the tape cassette that does not have the MIC 4, the tape streamer drive should update the system log of the system area B14 on the magnetic tape 3. Thus, the number of times of the accessing process and the amount of tape to be run increase. Thus, the access time for the record/reproduce operation becomes long.

On the other hand, as will be described in the following, in the case of the tape cassette that has the MIC 4, the load/unload operation can be performed in the middle of the tape. In addition, it is not necessary to update the system log of the system area B14 on the magnetic tape.

Figure 31:
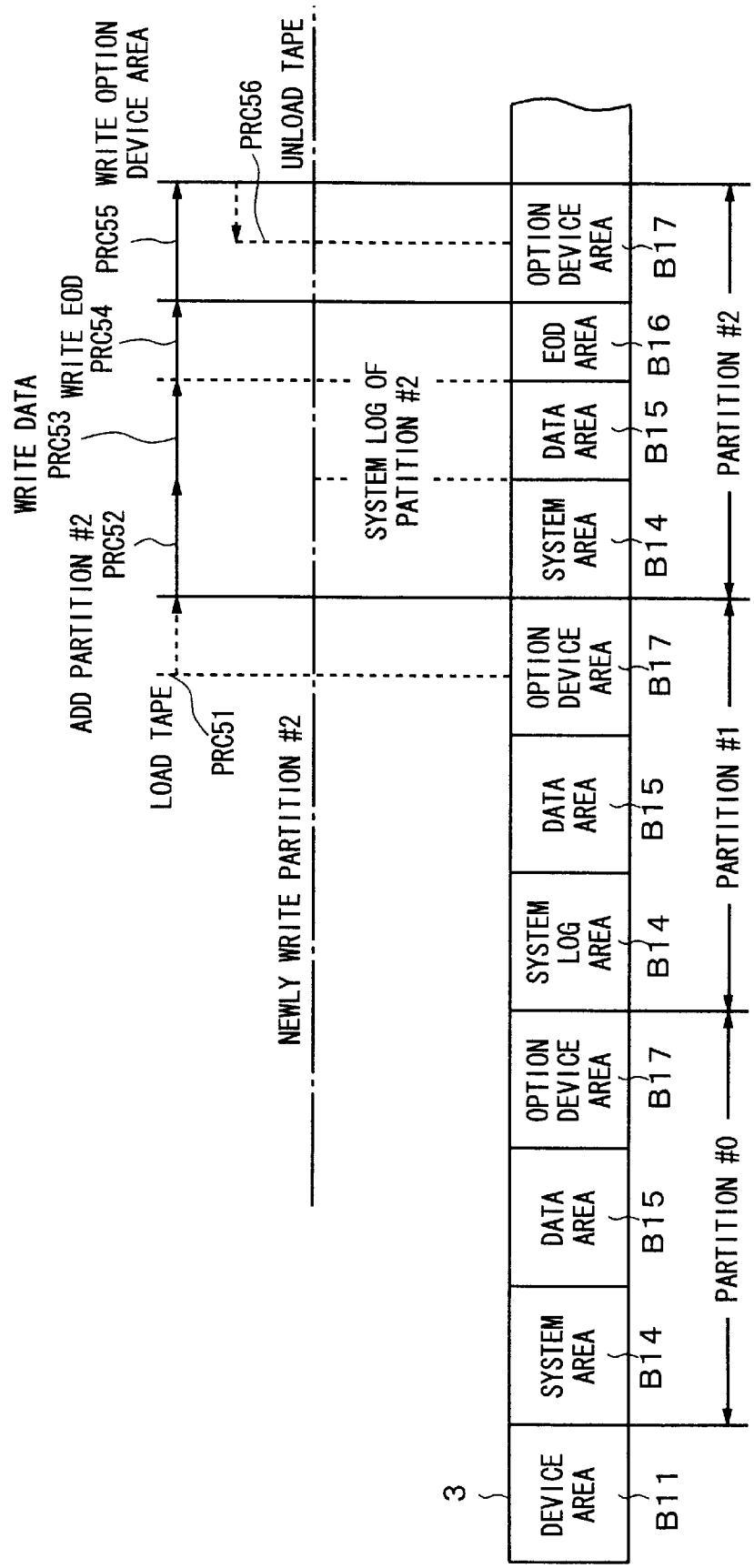

FIG. 31 shows an accessing process of the tape streamer drive in the record/reproduce mode in the case that the tape cassette has the MIC 4.

In this example, the accessing process for writing a new partition #2 to the magnetic tape on which partitions #0 and #1 have been recorded will be described.

Assume that the last process of the tape streamer drive to the magnetic tape 3 is a record/reproduce operation for the partition #1. In this case, when the tape streamer drive has completed the record operation or the reproduce operation for the partition #1, it performs the unload operation at the optional device area B17 of the partition 31 on the magnetic tape 3. Thus, the tape streamer drive performs the load operation (at step PRC51) that is the first operation for writing a new partition #2 at an optional device area of the partition #1.

The optional device area B17 is a device area formed for each partition. In other words, the optional device area B17 is formed for the load/unload operation for each partition. When the tape streamer drive records a partition in the tape cassette that has the MIC 4, the tape streamer drive writes the optional device area B17.

When the tape streamer drive performs the load operation at the optional device area B17 of the partition #1, it creates the system log area B14 of the partition #2 and the system log of the partition information of the MIC 4 from the frame next to the last end position of the partition #1 (in this case, the last end position of the optional device area B17 of the partition #1) (at step PRC52). Thereafter, the tape streamer drive writes data to the data area B15 (at step PRC54).

After the tape streamer drive has completely written the EOD area B16, it writes the optional device area B17 of the partition #2 (at step PRC55). After the tape streamer drive has completely written the optional device area B17, the tape streamer drive rewinds the magnetic tape 3 so that it accesses the middle position of the optional device area B17 and performs the unload operation at the position (at process PRC56).

At this point, the system log of the partition #2 corresponding to the record operation is stored in the partition information of the MIC 4. The position information of the unload operation is stored in the volume information of the MIC 4.

In the case of the tape cassette that does not have the MIC4, the load/unload operation should be performed at the device area B11 at the top of the magnetic tape. In addition, whenever the tape streamer drive records/reproduces data, it should access the system area of each partition and write the history information of the each partition to the system log of the system area B14 of each partition. Thus, the recording/reproducing time of the tape streamer drive becomes long.

On the other hand in the case of the tape cassette that has the MIC 4, each partition has the optional device area B17. The tape streamer drive performs the load/unload operation in the area. In addition, since the MIC 4 stores the history information for each device in the MIC 4, the tape streamer drive does not need to access the system area B14 of the magnetic tape. Thus, the accessing time of the record/reproduce operation can be reduced.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An information recording and reproducing apparatus, comprising:

identifying means for identifying a loaded cassette as a first type tape cassette or a second type tape cassette;

wherein the loaded cassette has a tape-shaped record medium in a cartridge, the first type tape cassette having a non-volatile memory in the cartridge, and the second type tape cassette not having a non-volatile memory in the cartridge;

initializing means for initializing at least the non-volatile memory when the loaded cassette is the first type tape cassette and for initializing the tape-shaped record medium when the loaded cassette is the second type tape cassette; and recording and reproducing means for recording and reproducing data to and from the tape-shaped record medium in the loaded cassette, the tape-shaped record medium being initialized by said initializing means;

wherein said initializing means records initialization information in a list structure to the non-volatile memory of the first type tape cassette, and wherein said initializing means divides the tape-shaped record medium into a plurality of record blocks and creates management information as the initialization information for each record block so as to manage data recorded for each one of said plurality of record blocks in the list structure.

2. The information recording and reproducing apparatus as set forth in claim 1, wherein the management information includes history information of the data recorded for each one of said plurality of record blocks and pointer information that represents a record position of the history information of a next one of said plurality of record blocks.

3. The information recording and reproducing apparatus as set forth in claim 2, wherein the pointer information further includes a record position of the history information of a previous one of said plurality of record blocks.

4. The information recording and reproducing apparatus as set forth in claim 1, wherein said initializing means initializes the tape-shaped record medium in a manner other than the list structure.

5. The information recording and reproducing apparatus as set forth in claim 1, wherein said initializing means initializes the non-volatile memory and then the tape-shaped record medium when the loaded cassette is the first type tape cassette.

* * * * *